United States Patent
Fogg et al.

(10) Patent No.: US 8,086,055 B2
(45) Date of Patent: *Dec. 27, 2011

(54) VARIABLE-LENGTH CODE DECODER

(75) Inventors: Chad E. Fogg, Seattle, WA (US); Nital P. Patwa, San Jose, CA (US); Parin B. Dalal, Milpitas, CA (US); Stephen C. Purcell, Mountain View, CA (US); Korbin Van Dyke, Sunol, CA (US); Steve C. Hale, San Jose, CA (US)

(73) Assignee: ATI Technologies ULC, Markham, Ontario (CA)

( * ) Notice: Subject to any disclaimer, the term of this patent is extended or adjusted under 35 U.S.C. 154(b) by 109 days.

This patent is subject to a terminal disclaimer.

(21) Appl. No.: 12/428,045

(22) Filed: Apr. 22, 2009

(65) Prior Publication Data

US 2010/0208826 A1    Aug. 19, 2010

Related U.S. Application Data

(60) Continuation of application No. 10/865,469, filed on Jun. 10, 2004, now Pat. No. 7,574,065, which is a division of application No. 09/444,010, filed on Nov. 19, 1999, now Pat. No. 6,775,414.

(51) Int. Cl.
  *G06K 9/36* (2006.01)
  *G06K 9/46* (2006.01)

(52) U.S. Cl. ...................................... 382/246

(58) Field of Classification Search .......... 382/232, 382/233, 236, 244–247, 284, 305; 708/400, 708/490, 524, 709; 341/59, 63, 67, 187; 711/168; 712/23, 35, 210, 244, 300; 715/236; 348/699; 375/240.16, 240.23, E7.2; 345/520, 345/559, 568

See application file for complete search history.

(56) References Cited

U.S. PATENT DOCUMENTS

| | | | |
|---|---|---|---|
| 4,807,181 A | 2/1989 | Duncan et al. | |
| 4,874,164 A * | 10/1989 | Miner et al. | 345/562 |
| 5,193,204 A | 3/1993 | Qureshi et al. | |
| 5,274,792 A | 12/1993 | Sato | |
| 5,388,841 A * | 2/1995 | San et al. | 463/44 |
| 5,517,436 A | 5/1996 | Andreas et al. | |
| 5,675,331 A | 10/1997 | Watanabe et al. | |
| 5,872,597 A * | 2/1999 | Yamakage et al. | 375/240.16 |
| 5,991,874 A | 11/1999 | Mills et al. | |
| 6,003,126 A * | 12/1999 | Huynh et al. | 712/217 |
| 6,071,004 A | 6/2000 | Le Gall et al. | |
| 6,122,442 A | 9/2000 | Purcell et al. | |
| 6,266,761 B1 | 7/2001 | Carlson et al. | |
| 6,301,655 B1 * | 10/2001 | Manohar et al. | 712/244 |
| 6,313,766 B1 * | 11/2001 | Langendorf et al. | 341/67 |
| 6,324,306 B1 * | 11/2001 | Natsume | 382/246 |
| 6,330,581 B1 | 12/2001 | Hale | |
| 6,381,692 B1 | 4/2002 | Martin et al. | |
| 6,421,698 B1 | 7/2002 | Hong | |

(Continued)

*Primary Examiner* — Amir Alavi
(74) *Attorney, Agent, or Firm* — Baker & Daniels LLP

(57) ABSTRACT

An apparatus includes at least one general purpose register and at least one special purpose register and an execution unit that executes at least two instructions in parallel, to decode variable length codes, wherein each of the instructions share use of the at least one general purpose register and the at least one special purpose register. In one example, a processor stores variable length code information among a plurality of general purpose registers and generates decoded variable length code information by decoding the at least one variable length code. The processor also stores the decoded variable length code information among the plurality of general purpose registers.

17 Claims, 36 Drawing Sheets

U.S. PATENT DOCUMENTS

| | | | |
|---|---|---|---|
| 6,499,099 B1 * | 12/2002 | Cho | 712/210 |
| 6,573,846 B1 * | 6/2003 | Trivedi et al. | 341/67 |
| 6,697,076 B1 * | 2/2004 | Trivedi et al. | 345/568 |
| 6,760,478 B1 | 7/2004 | Adiletta et al. | |
| 6,775,414 B1 * | 8/2004 | Fogg et al. | 382/246 |
| 6,822,654 B1 * | 11/2004 | Trivedi et al. | 345/520 |
| 6,877,020 B1 * | 4/2005 | Bratt et al. | 708/400 |
| 6,931,511 B1 * | 8/2005 | Weybrew et al. | 712/4 |
| 6,958,718 B2 * | 10/2005 | Symes et al. | 341/106 |
| 7,055,018 B1 | 5/2006 | Bratt et al. | |
| 7,574,065 B2 * | 8/2009 | Fogg et al. | 382/246 |
| 2002/0084922 A1 | 7/2002 | Yagi | |
| 2005/0089238 A1 | 4/2005 | Fogg et al. | |
| 2010/0208826 A1 * | 8/2010 | Fogg et al. | 375/240.23 |

\* cited by examiner

TO FOUR INPUT ADDER 411

VARIABLE-LENGTH CODE DECODER

CROSS-REFERENCE TO RELATED COPENDING APPLICATIONS

This application is a continuation of U.S. patent application Ser. No. 10/865,469, filed Jun. 10, 2004, entitled Variable-Length Code Decoder, now U.S. Pat. No. 7,574,065, which is a divisional of U.S. patent application Ser. No. 09/444,010, filed Nov. 19, 1999, having as inventors Chad E. Fogg et al., now U.S. Pat. No. 6,775,414, owned by instant assignee and incorporated herein by reference in their entireties.

CROSS REFERENCE TO APPENDIX INCLUDING COMPUTER PROGRAM LISTINGS

Appendices A-E, which are integral parts of the present disclosure, include a listing of a computer program and its related data in one embodiment of this invention. This computer program listing contains copyrighted material. The copyright owner, ATI Technologies, which is also the Assignee of the present patent application, has no objection to the facsimile reproduction by anyone of the patent document or the present disclosure, as it appears in the Patent and Trademark Office patent files or records, but otherwise reserves all copyrights whatsoever.

BACKGROUND OF THE INVENTION

1. Field of the Invention

The present invention relates to video decoding. More particularly, the present invention relates to decoding video data encoded under one of the MPEG standards.

2. Discussion of Related Art

The Motion Picture Experts Group (MPEG) has promulgated two encoding standards for full-motion digital video and audio, popularly referred to as "MPEG-1" and "MPEG-2", which provide efficient data transmission. MPEG encoding techniques can be used in digital video such as high definition television (HDTV). A publication describing MPEG-1 and MPEG-2 encoding and decoding techniques, Mitchell, J., Pennebaker, W., Fogg, C., and LeGall, D., *MPEG Video Compression Standard*, Chapman and Hall, New: York, N.Y. (1996), is incorporated herein by reference. The detailed description below is applicable to both MPEG-1 and MPEG-2 standards, unless otherwise provided. To simplify the description, where the description is applicable to both MPEG-1 and MPEG-2 standards, the term "MPEG" refers to both standards.

Under either MPEG standard, a video sequence is organized as a series of "pictures". Each picture can be one of three types: predicted pictures (P-pictures), intra-coded pictures (I-pictures), and bidirectionally coded pictures (B-pictures). I-pictures are encoded without respect to other pictures. Each P-picture or B-picture is encoded as a set of differences with respect to one or more reference pictures, which can be I-pictures or P-pictures.

Each picture is further divided into data sections known as "slices", each consisting of a number of "macroblocks," which are each organized as eight or twelve 8-pixel by 8-pixel (8×8) blocks. Under one level of color precision, a macroblock includes four 8×8 blocks of brightness (luminance) samples, two 8×8 blocks of "red" samples ("red-chrominance"), and two 8×8 blocks of "blue" ("blue-chrominance") samples. Under this level of color precision, red-chrominance and blue-chrominance samples are sampled only half as often as the luminance samples. Under another level of color precision, a macroblock includes four 8×8 luminance blocks, four 8×8 red-chrominance blocks, and four 8×8 blue-chrominance blocks. Information regarding each macroblock is provided by a macroblock header which identifies (a) the position of the macroblock relative to the position of the most recently coded macroblock, (b) which of the 8×8 blocks within the macroblock are encoded as intra-blocks (i.e., without reference to blocks from other pictures), and (c) whether a new set of quantization constants is to be used.

The first step in encoding the 8×8 blocks is to transform each block into the frequency domain using a 2-dimensional discrete cosine transform (DCT). The applicable 2-dimensional DCT consists of a "horizontal" and a "vertical" spatial DCT, as is known in the art. DCT represents the luminance or chrominance values of a block as a set of coefficients in a sum of cosine functions. Next, each coefficient of the block in frequency space is "quantized." For I-pictures, quantization is intended to reduce the coefficients of the higher frequencies to zero. For P-pictures and B-pictures, which represent temporal changes in the luminance or chrominance values over time, quantization also reduces many of the coefficients to zero. The quantized coefficients can be achieved by dividing each coefficient of a block by a corresponding integer quantization constant, and then rounding the result to the nearest integer.

The 2-dimensional blocks are then read as a linear list of values by scanning the values of the 8×8 block under a "zigzag scanning order." MPEG-2 specifies two zigzag scanning orders, which are depicted in FIG. 1. Under either of these zigzag scanning orders, zero coefficients tend to congregate or "run" next to each other, allowing a compact representation (a "run-level" pair, as described below). An end-of-block symbol is used to indicate that all remaining coefficients in the zigzag scanned list are zero.

All non-zero coefficients, other than the DC-coefficient, defined below, are then represented using a "run-level" coding. "Level" is the amplitude of a non-zero coefficient. "Run" is the number of zero-amplitude coefficients between the most recent non-zero coefficient and the present non-zero coefficient. For I-pictures, the DC-coefficient, which is the zero-frequency coefficient, is represented as a difference from the DC-coefficient of the most recent reference block of the same block type (i.e., luminance, red-chrominance, or blue-chrominance). Next, the "run-level" encoded lists are transformed into variable-length codes using a Huffman coding technique. Huffman coding assigns shorter codes to more frequently occurring values. (The macroblock header is also encoded).

A conventional decoding process 200 of an MPEG block is depicted schematically in FIG. 2. An MPEG decoder receives an input encoded video data stream ("bitstream") from a video data source, such as a satellite transmitter, a disk, or a DVD ROM. The bitstream consists of variable-length codes obtained using an encoding process described above. As shown in FIG. 2, a bitstream fetch operation 202 captures the bitstream. A decode operation 204 then recovers the run, level, and length of each variable-length code, according to the encoding standard used and the picture type. Typically, the variable-length codes are decoded using a table look-up technique. To recover the current DC-coefficient, the DC-coefficient of the most recent I-picture encoded block of the same block type is added to the present DC-coefficient.

The next step of decoding process 200 is depicted in FIG. 2 as inverse scan 206. Inverse scan 206 assigns the coefficients from the variable length decode operation 204 into 8×8 blocks. Next, an inverse quantization step 208 multiplies each coefficient in an 8×8 block obtained from inverse scan 206 by the same corresponding quantization constant used in the quantization procedure during encoding, and rounds the result to the nearest integer. In addition, to compensate for precision losses during encoding and decoding, an "oddification" step (MPEG-1) or a "mismatch control" step (MPEG-2) is applied during inverse quantization procedure 208.

Next, an inverse discrete cosine transform (IDCT) 210, such as described by Mitchell, J., Pennebaker, W., Fogg, C., and LeGall, D., *MPEG Video Compression Standard*, Chapman and Hall, New York, N.Y. (1996), is applied to the 8×8 blocks to return the blocks to a time domain representation, which is also known as a spatial domain representation.

In the prior art, the decoding process 200 described thus far, i.e., from the bitstream fetch operation 202 to the IDCT 210, is already too computationally demanding for decoding using a typical conventional microprocessor. For example, a DVD player using only an Intel x86 CPU to decode MPEG data cannot perform the above decoding process fast enough. Even at 200 MHz, an x86 CPU must dedicate all of its resources to process video. Even then, some frames would be lost.

A DVD player with a separate MPEG decoder and an x86 CPU achieves better results. With a separate MPEG decoder, the demand on the x86 CPU is significantly diminished. However, there are several drawbacks to a separate MPEG decoder. First, partitioning the decoding tasks between the processors is complex, especially when the processors execute different instruction sets. Second, a separate MPEG decoder results in higher costs for MPEG decoding. Third, even then, MPEG decoding for replay on a H0-type HDTV is still not quick enough to avoid frame loss.

Therefore, what is needed is an MPEG decoder which decodes variable-length codes for replay on a H0-type HDTV quickly enough to avoid frame loss but without the expense and complexity of a dedicated MPEG decoder.

SUMMARY

An embodiment of the invention includes a computer system for executing instructions to decode variable length codes, the variable length codes being sequentially-received. The computer system includes an execution unit that includes multiple functional units executing at least two of the instructions in parallel; general purpose registers, where each of the instructions share the general purpose registers; and special purpose registers, where each of the instructions share the special purpose registers.

The present invention will be more fully understood in light of the following detailed description taken together with the accompanying drawings.

BRIEF DESCRIPTION OF THE DRAWINGS

Note that use of the same reference numbers in different figures indicates the same or like elements.

DETAILED DESCRIPTION

Overview

Figure 2:
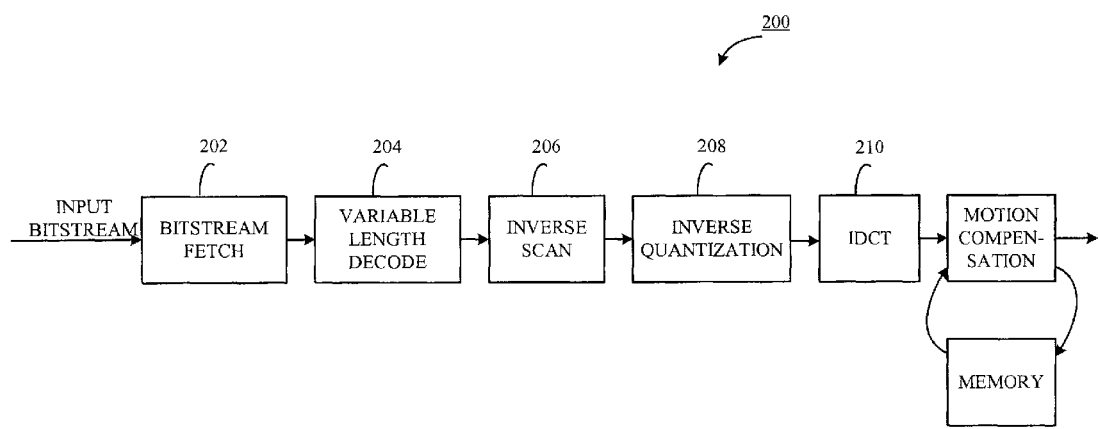
FIG. 2 depicts schematically a conventional decoding process 200 of an MPEG block.
Figure 3:
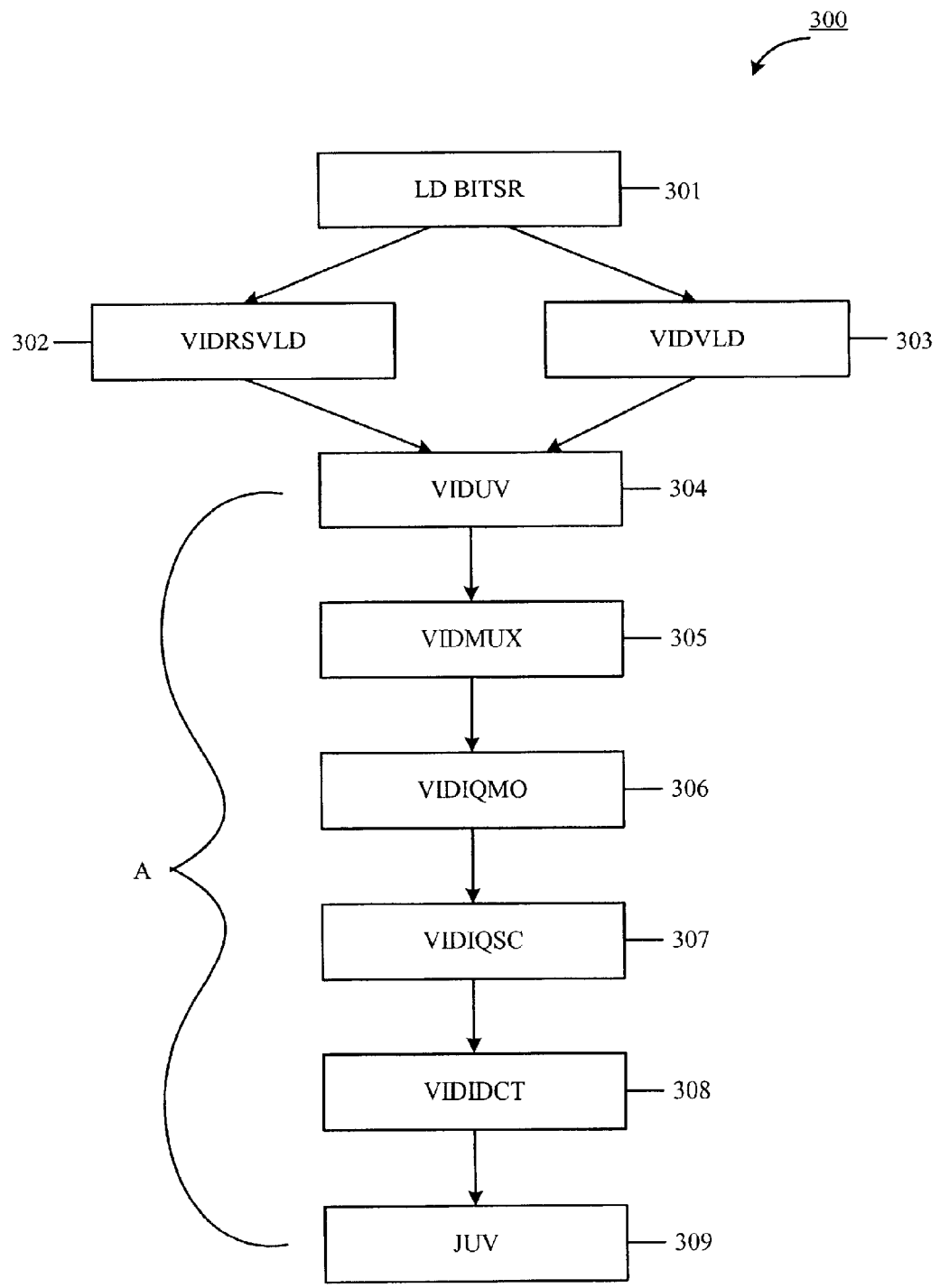
FIG. 3 depicts an exemplary code segment 300 for decoding two sequential MPEG variable-length codes from an input bitstream.

An embodiment of the present invention is depicted in FIG. 3. FIG. 3 depicts an exemplary code segment 300 for decoding two (or more) sequential MPEG variable-length codes from an input bitstream. In this embodiment, decoding includes operations 202-210 described with respect to FIG. 2. As shown in FIG. 3, code segment 300 includes calls to instructions LDBITSR, VIDRSVLD, VIDVLD, VIDUV, VIDMUX, VIDIQMO, VIDIQSC, VIDIDCT, and JUV. Instruction LDBITSR loads two sequential variable-length codes. For a first variable-length code, call 302 calls instruction VIDRSVLD. Next calls 304-309 are calls to a group of instructions labeled "A", which includes instructions VIDUV, VIDMUX, VIDIQMO, VIDIQSC, VIDIDCT, and JUV. Following completion of instruction JUV, a first variable-length code is decoded. For the next sequential variable-length code, the first call is call 303 which hails instruction VIDVLD. Next calls 304-309 are calls to the group of instructions labeled "A". Following completion of instruction JUV, the next sequential variable-length code is decoded.

After all instructions VIDUV, VIDMUX, VIDIQMO, VIDIQSC, and VIDIDCT are applied to all coefficients of a full block, instruction PBFY (not depicted) is executed to complete a horizontal inverse discrete transform for all coefficients of the block.

Pseudo-codes for instructions LDBITSR, VIDRSVLD, VIDVLD, VIDUV, VIDMUX, and VIDIDCT are provided, respectively, in Appendices A, B-1, B-2, C, D, and E.

While the code has been described as operating serially, that is, completing the decoding of a first variable-length code prior to beginning decoding of a subsequent sequential variable-length code, in practice, multiple instructions may execute simultaneously (so called "interleaved operation") thereby decoding simultaneously multiple variable-length codes. Interleaved operation maximizes hardware execution of the instructions and thereby minimizes the time to decode variable-length codes. Interleaved operation will be discussed in more detail below.

Suitable Hardware Platform

Figure 4A:
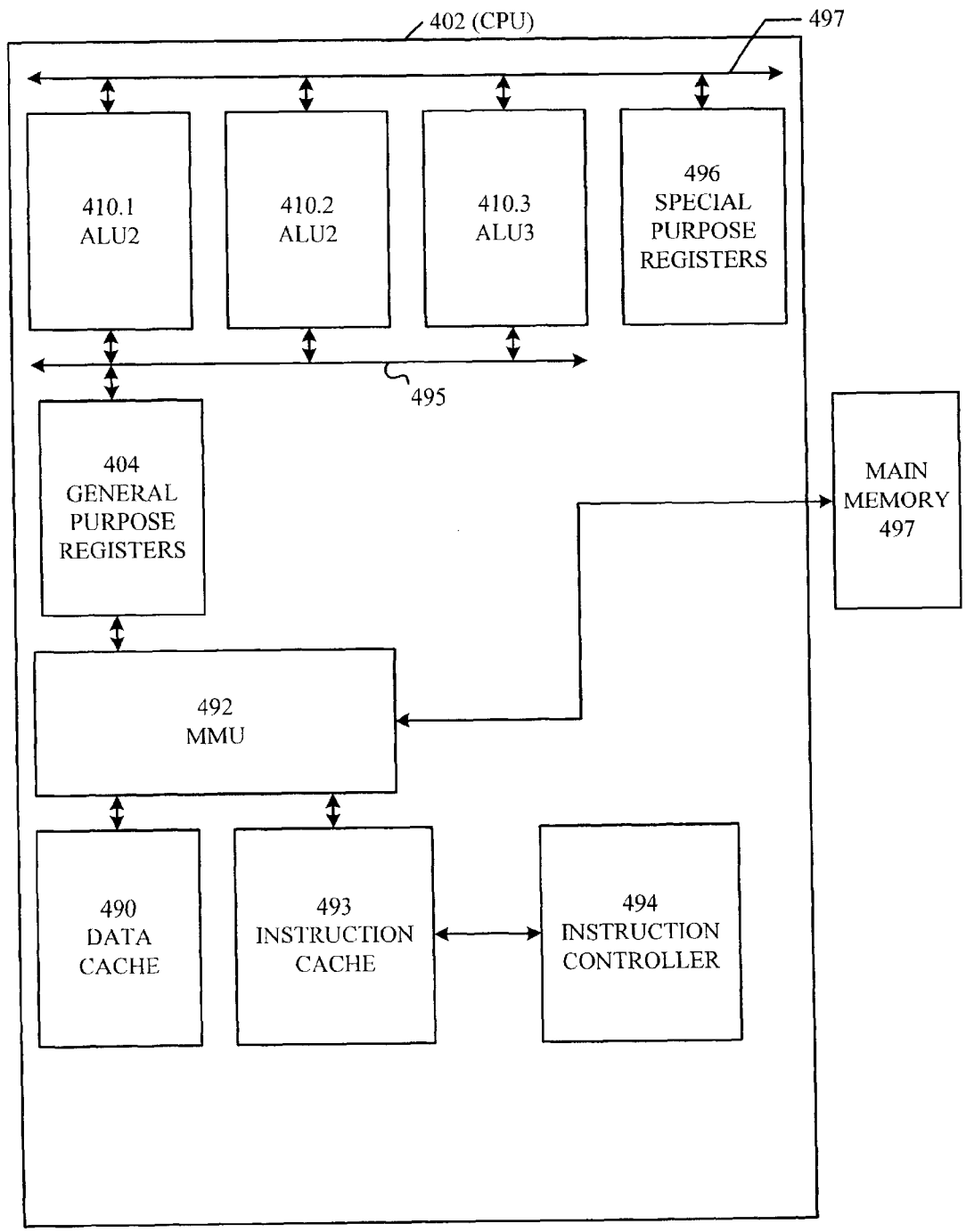
FIG. 4A depicts a suitable apparatus to execute operations specified by the instructions of code segment 300 of FIG. 3 in accordance with an embodiment of the present invention.

A suitable apparatus to execute operations specified by the instructions of code segment 300 of FIG., 3 is depicted in FIG. 4A. FIG. 4A includes a central processing unit (CPU) 402, which in this embodiment, executes an x86 compatible instruction set architecture. CPU 402 includes first ALU 410.1, second ALU 410.2, third ALU 410.3, general purpose registers 404, conventional memory management unit (MMU) 492, conventional data cache 490, special purpose registers 496, instruction cache 493, and instruction controller 494.

First ALU 410.1, second ALU 410.2, and third ALU 410.3 are respectively depicted in FIGS. 4B, 4E, and 4H and each is described in more detail below. In this embodiment, general purpose registers 404 stores 64, 64 bit registers. In this embodiment, special purpose registers 496 stores registers video_mbstate and video_uv, discussed in more detail below. The conventional instruction cache 493 stores instructions. The conventional instruction controller 492 executes instructions and coordinates pipelined operation, discussed in more detail below.

Each of first ALU 410.1, second ALU 410.2, third ALU 410.3, and special purpose registers 496 communicate through bus 498. Each of first ALU 410.1, second ALU 410.2, third ALU 410.3, and general purpose registers 404 communicate through bus 495. MMU 492 communicates with general purpose registers 404, data cache 490, instruction cache 493, and a conventional main memory 497. Instruction cache 493 and instruction controller 494 communicate.

In this embodiment, first ALU 410.1 includes hardware used by instructions LDBITSR and VIDMUX; second ALU 410.2 includes hardware used by instructions VIDRSVLD/VIDVLD and VIDUV; and third ALU 410.3 includes hardware used by instructions VIDIQMO, VIDIQSC, and VIDIDCT. In accordance with an embodiment of the present invention, providing dedicated ALUs to execute specific instructions allows for multiple instructions to execute simultaneously. Thereby, interleaved operation can be achieved.

First ALU 410.1

Figure 4B:
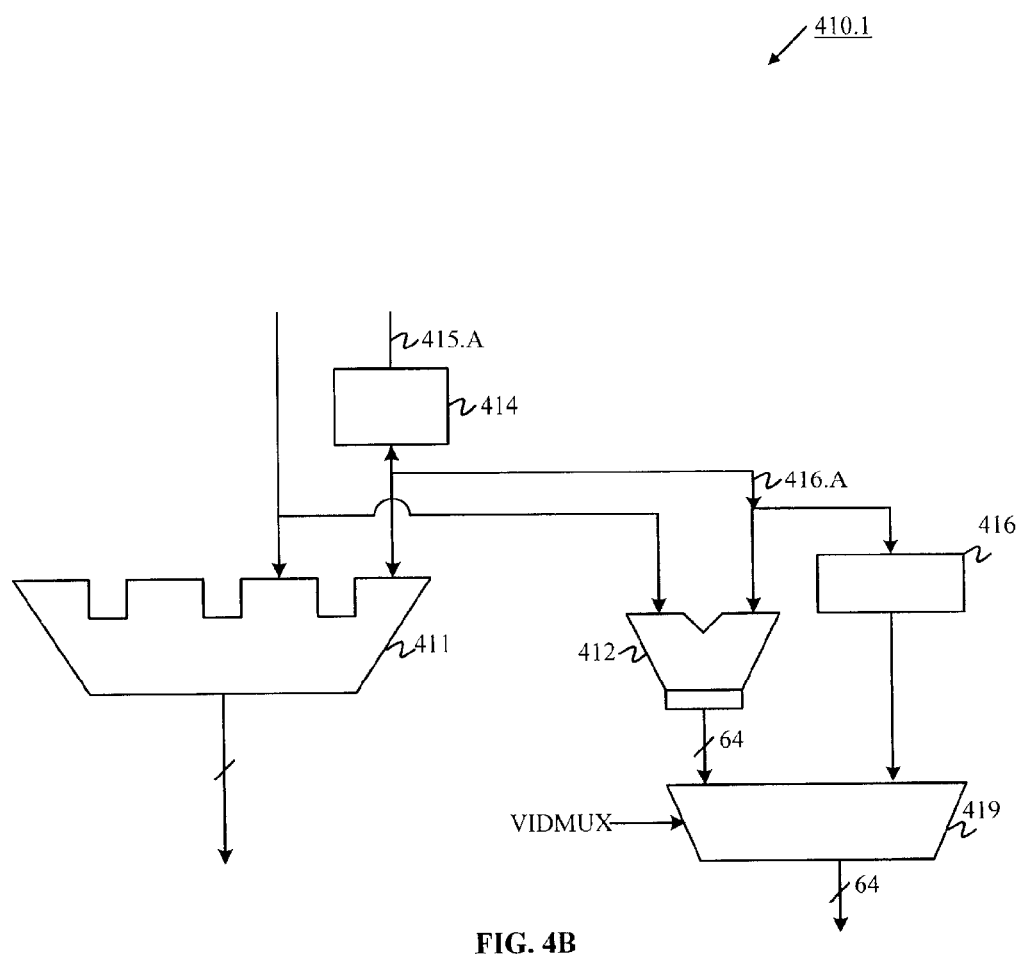
FIG. 4B schematically depicts first ALU 410.1 in more detail in accordance with an embodiment of the present invention.

FIG. 4B schematically depicts first ALU 410.1 in more detail. A first stage includes a conventional adder 411, capable of receiving four inputs, and a conventional two input arithmetic logic unit (ALU) 412, both operating in parallel. A suitable arithmetic logic unit 412 is a conventional 8 way, 8 bit Single Instruction Multiple Data (SIMD) two input arithmetic logic unit having adding, subtracting, AND, OR, and XOR capability with source merging at 8 bit boundaries for x86 compatibility. A suitable arithmetic logic unit 411 is described in "An Apparatus And A Method For Address Generation", inventor Stephen C. Hale, Ser. No. 09/149,881, filed Sep. 8, 1998.

First ALU 410.1 further includes a zero extender circuit 414, used during execution of instruction LDBITSR and that provides an input to adder 411, and zero stuffer circuit 416, used during execution of instruction VIDMUX. The output of zero extender circuit 414 is provided to both ALU 412 and zero stuffer circuit 416.

Zero Extender 414

Figure 4C:
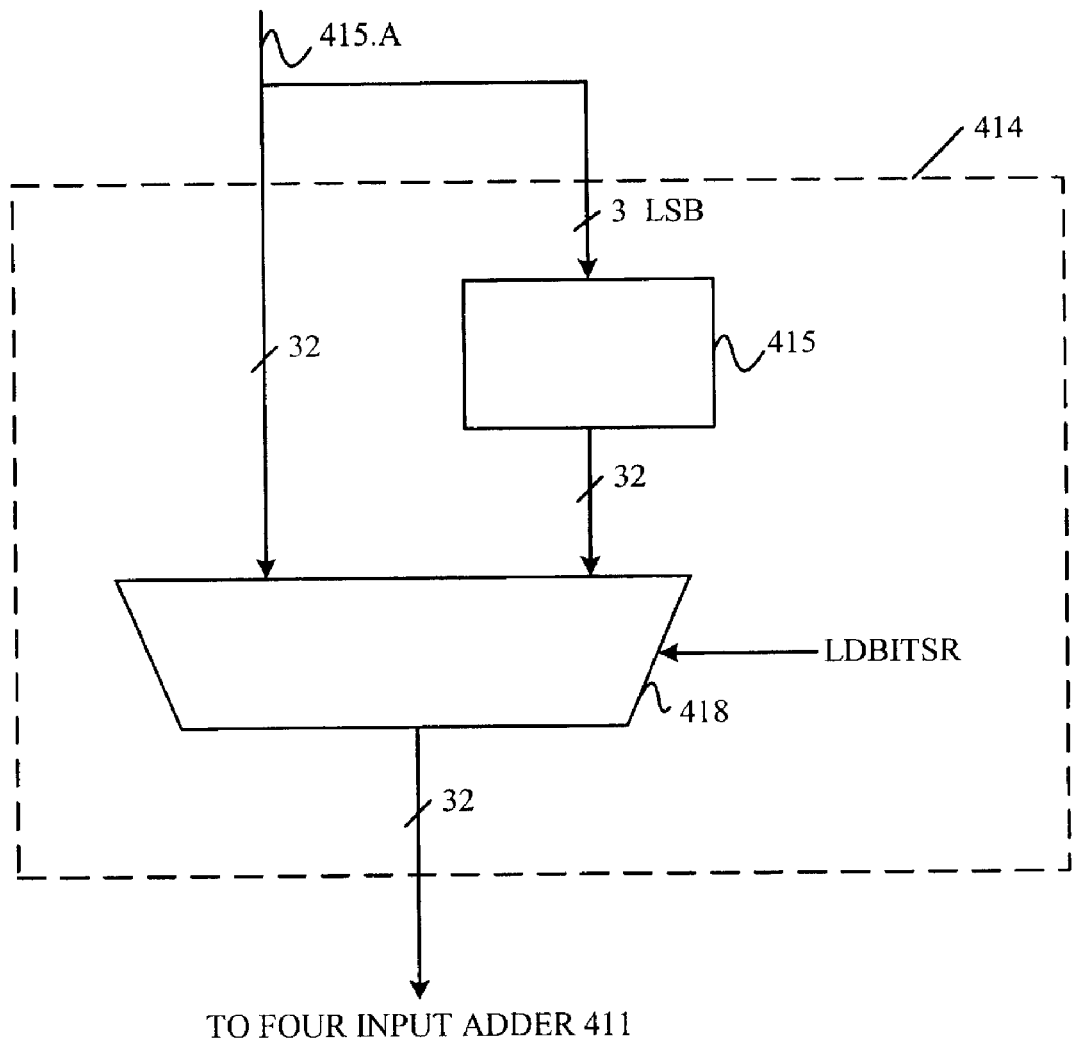
FIG. 4C schematically depicts zero extender 414 in accordance with an embodiment of the present invention.

FIG. 4C schematically depicts zero extender 414. Zero extender 414 includes an extender circuit 415 that receives the 3 least significant bits of input 415.A. The extender circuit 415 converts the 3 bit input into a 32 bit value. The operation of extender circuit 415 is described in more detail with respect to LDBITSR. The output of the extender circuit 415 is an input to multiplexer 418. Multiplexer 418 outputs the output value from extender circuit 415 when instruction LDBITSR executes. Otherwise, multiplexer 418 outputs the 32 bit input 415.A.

The output of multiplexer 418 is coupled to an input terminal of adder 411. Thus when instruction LDBITSR does not execute, input value 415.A is coupled to adder 411. Thereby an input of adder 411 is available for use when LDBITSR does not execute.

Zero Stuffer Circuit 416

Figure 4D:
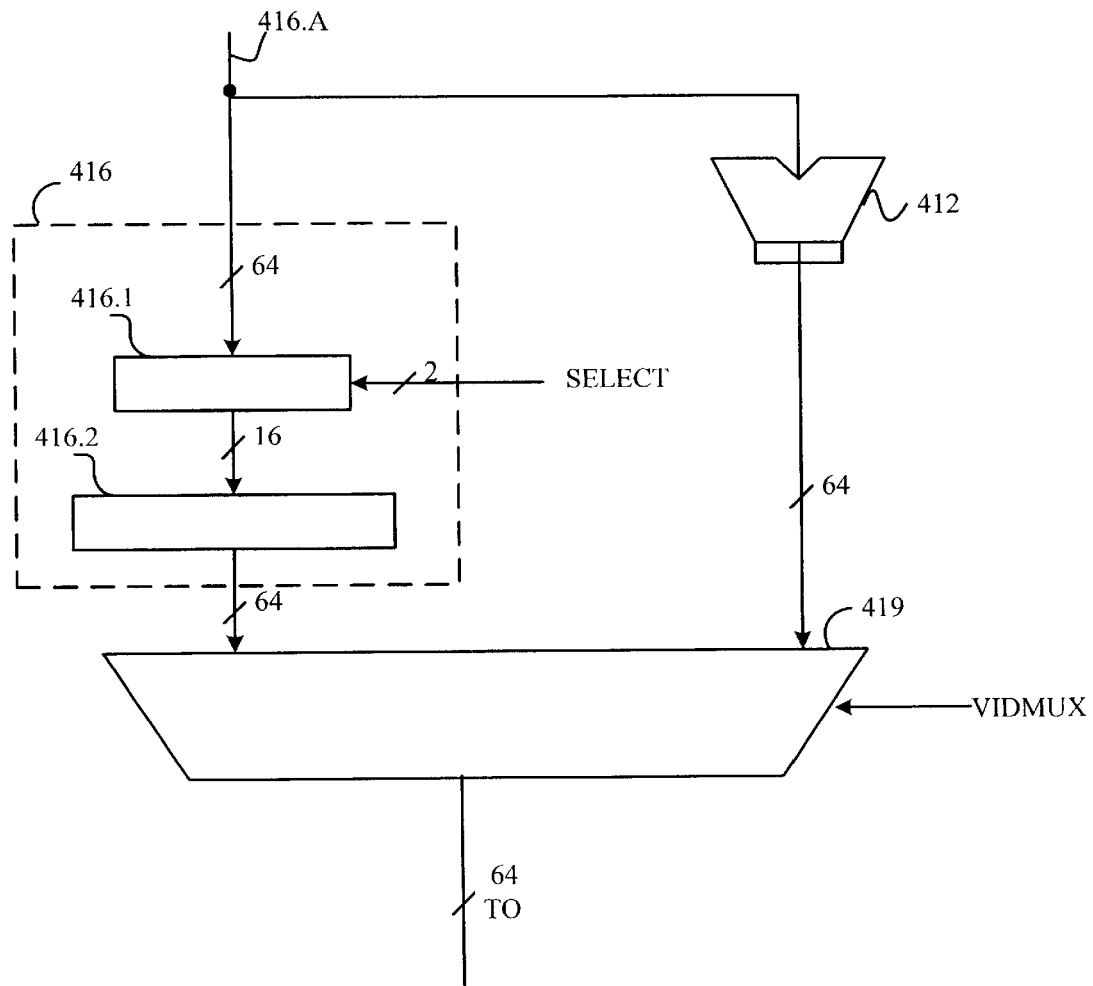
FIG. 4D schematically depicts zero stuffer circuit 416 in accordance with an embodiment of the present invention.

FIG. 4D schematically depicts zero stuffer circuit 416. Input 416.A to the arithmetic logic unit 412 is coupled to zero stuffer circuit 416. First stage 416.1 of zero stuffer device selects bits 0 . . . 15, 16-31, 32-47, or 48-63 of input 416.A, depending on the value of "select" signal. The output of first stage 416.1 is coupled to second stage 416.2. Second stage 416.2 of zero stuffer circuit 416 stores the selected 16 bits into bits 32 to 47 of a 64 bit value, where bits 0 to 31 and bits 48 to 63 are zero. The zero stuffer circuit 416 outputs the 64 bit value as an input to multiplexer 419. Multiplexer 419 selects an output of zero stuffer circuit 416 when instruction VIDMUX executes and otherwise selects an output of arithmetic logic unit 412.

Second ALU 410.2

Figure 4E:
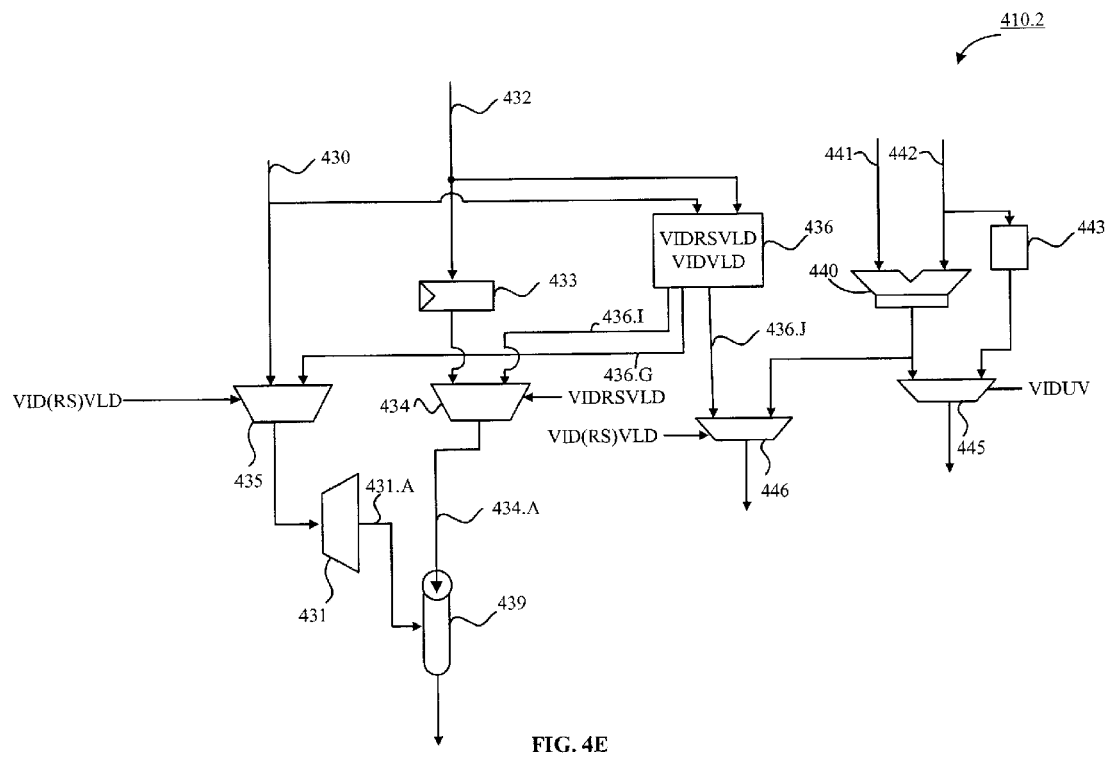
FIG. 4E schematically depicts second ALU 410.2 in accordance with an embodiment of the present invention.

FIG. 4E schematically depicts second ALU 410.2. Second ALU 410.2 receives inputs of 430, 432, 441, and 442. Input 432 is provided to a flip flop 433, which provides the input 432 to a multiplexer 434. Inputs 430 and 432 are provided to VIDVLD/VIDRSVLD circuit 436. VIDVLD/VIDRSVLD circuit 436 is described in more detail with respect to instructions VIDVLD and VIDRSVLD. The VIDVLD/VIDRSVLD circuit 436 provides outputs 436.1 and 436.G to respective multiplexers 434 and 435. Multiplexer 434 selects output 436.1 when instruction VIDRSVLD executes.

Multiplexer 435 is coupled to receive inputs 430 and 436.G. Multiplexer 435 selects output 436.G when either instruction VIDRSVLD or VIDVLD execute. Multiplexer 435 provides its output to shift amount decoder 431. Shift amount decoder 431 and multiplexer 434 provide respective outputs 431.A and 434.A to shifter/rotater 439. Shifter/rotater 439 shifts the input 434.A by an amount specified by output 431.A.

ALU 440, which is similar to ALU 412, receives inputs 441 and 442. Input 442 is further coupled to VIDUV circuit 443, described in more detail below. The outputs of the ALU 440 and VIDUV circuit 443 are coupled to a multiplexer 445, which selects the output from VIDUV circuit 443 when instruction VIDUV executes.

Multiplexer 446 receives input 436.J from VIDVLD/VIDRSVLD circuit 436 and an input from ALU 440 and selects the input from VIDVLD/VIDRSVLD circuit 436 when either instruction VIDRSVLD or VIDVLD execute.

VIDVLD/VIDRSVLD Circuit 436

Figure 4F:
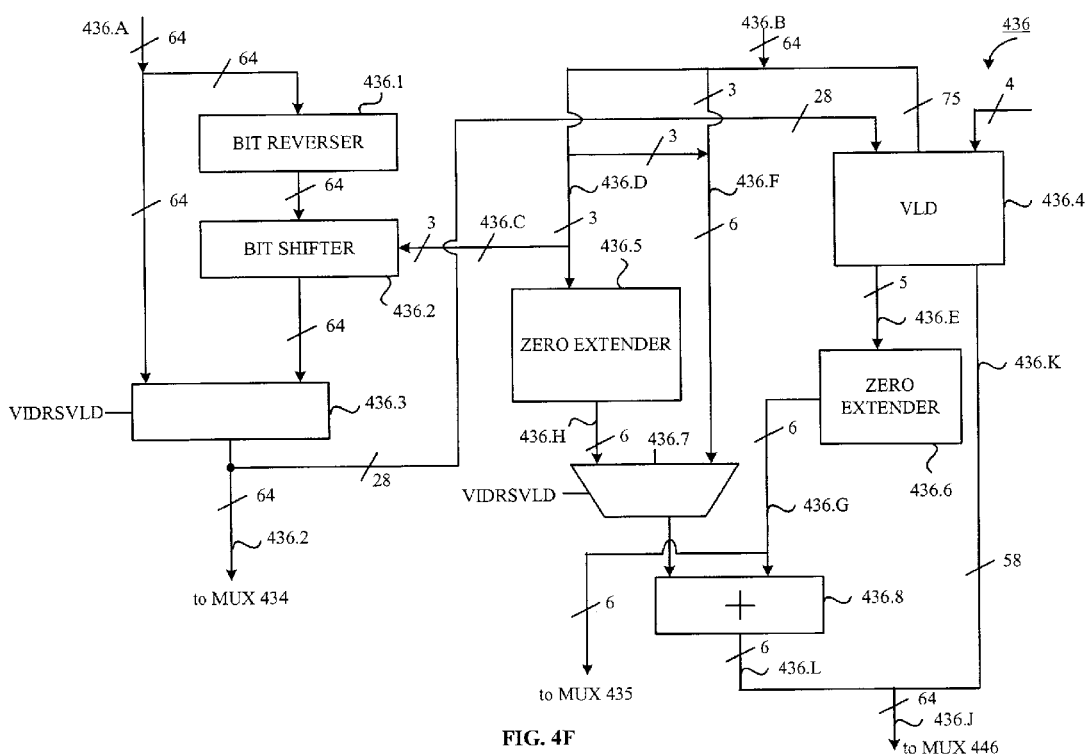
FIG. 4F schematically depicts VIDVLD/VIDRSVLD circuit 436 in accordance with an embodiment of the present invention.

FIG. 4F schematically depicts VIDVLD/VIDRSVLD circuit 436 used during execution of instructions VIDRSVLD and VIDVLD. The operation of VIDVLD/VIDRSVLD circuit 436 is described with respect to instructions VIDVLD and VIDRSVLD.

VIDUV Circuit 443

Figure 4G:
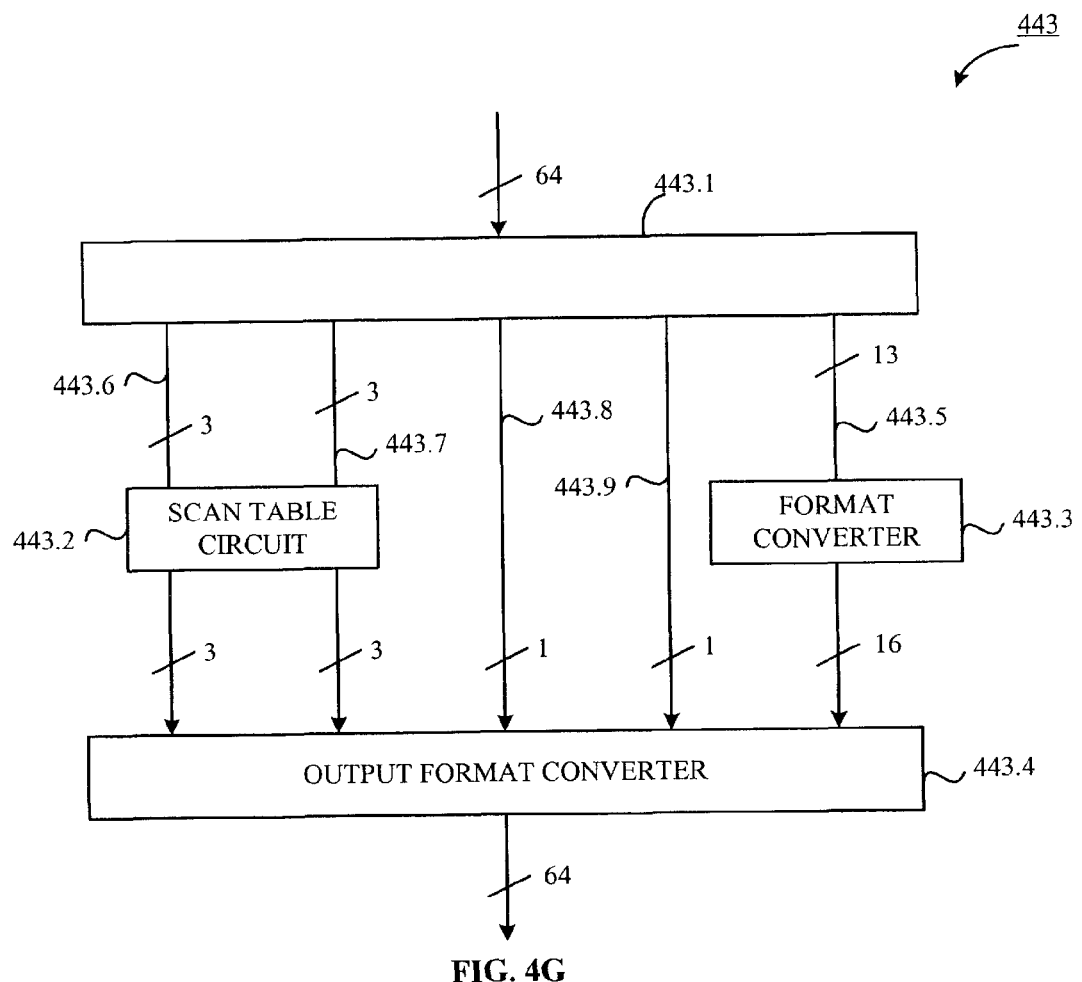
FIG. 4G schematically depicts VIDUV circuit 443. VIDUV circuit 443 in accordance with an embodiment of the present invention.

FIG. 4G schematically depicts VIDUV circuit 443. VIDUV circuit 443 is used during the execution of instruction VIDUV. VIDUV circuit 443 includes input divider 443.1, scan table circuit 443.2, format converter 443.3, and output format converter 443.4.

Input divider 443.1 receives a 64 bit input, also coupled to an input of ALU 440 of the second ALU 410.2, and outputs 5 quantities. In this embodiment, the relationship between the 5 quantities and bits in the 64 bit input value is shown in the following table:

| Input bit(s) | Output of input divider 443.1 |
| --- | --- |
| 45 . . . 33 | 13 bit output ("first input 443.5") |
| 10 . . . 8 | 3 bit output ("second input 443.6") |
| 7 | 1 bit output ("third input 443.8") |
| 6 | 1 bit output ("fourth input 443.9") |
| 5 . . . 3 | 3 bit output ("fifth input 443.7"). |

Second input 443.6 and fifth input 443.7 are coupled to scan table circuit 443.2. Scan table circuit 443.2 converts each of 443.6 and fifth input 443.7 in a manner described in more detail below with respect to instruction VIDUV.

Format converter 443.3 receives the first input 443.5 and outputs a 16 bit value having the following properties: 1) the least significant bit is 0; 2) the two most significant bits are each set to the most significant bit of 13-bit output; 3) bits 13 to 1 are set to the 13-bit output.

Each of the outputs from scan table circuit 443.2, format converter 443.3 as well as the third and fourth inputs are coupled to output format converter 443.4. Output format converter 443.4 generates a 64 bit value, having the following properties:

| Bit(s) | Content(s) |
| --- | --- |
| 63 . . . 48 | 0 |
| 47 . . . 32 | output from format converter 443.3 |
| 31 . . . 11 | 0 |
| 10 . . . 8 | converted second input 443.6 |
| 7 | third input 443.8 |
| 6 | fourth input 443.9 |
| 5 . . . 3 | converted fifth input 443.7 |
| 2 . . . 0 | 0. |

The VIDUV circuit 443 outputs a 64 bit value to multiplexer 445, which selects the 64 bit value when the instruction VIDUV executes.

Third ALU 410.3

Figure 4H:
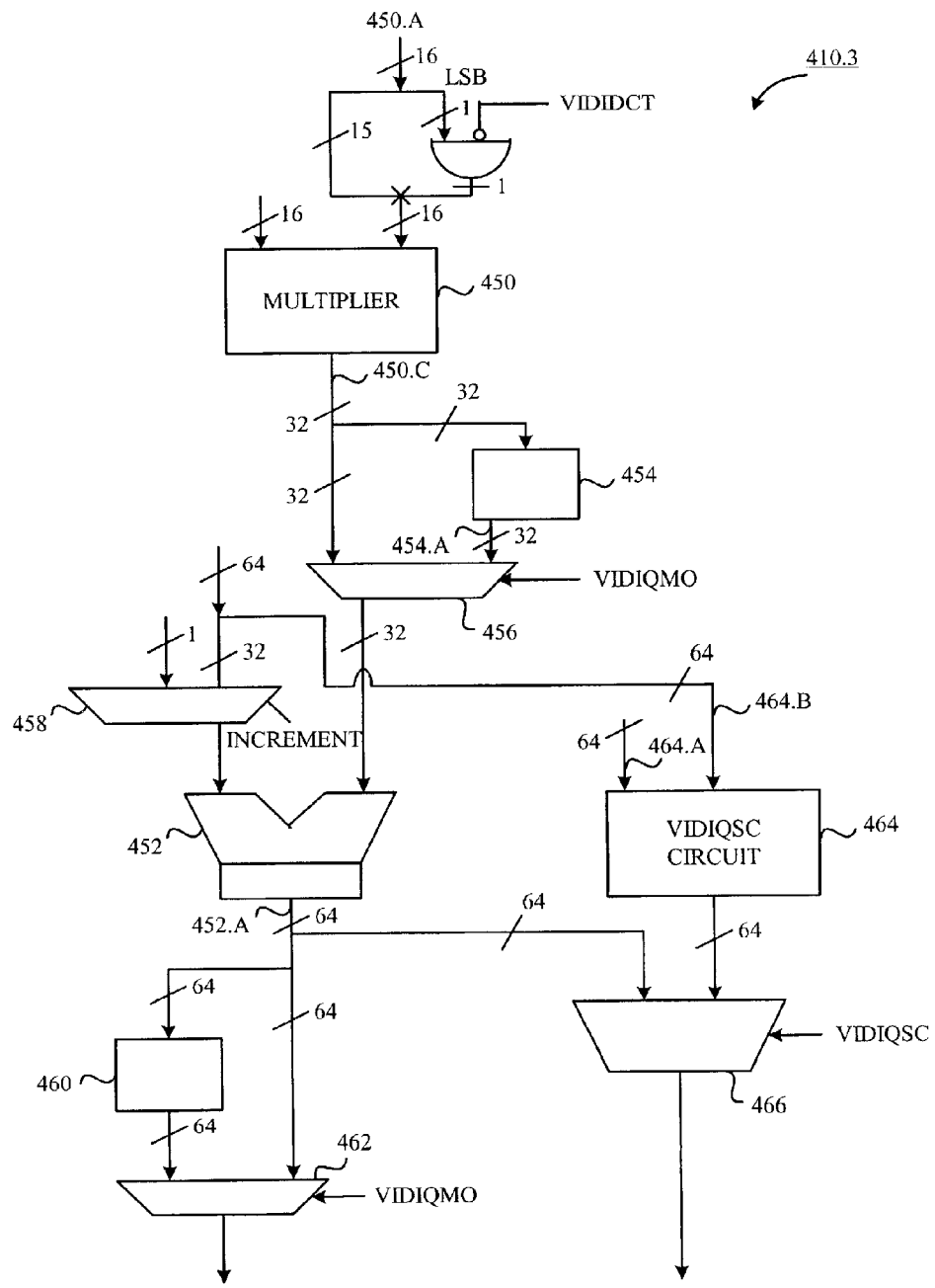
FIG. 4H schematically depicts third ALU 410.3 in accordance with an embodiment of the present invention.

FIG. 4H schematically depicts third ALU 410.3. Third ALU 410.3 includes a conventional multiplier 450, that performs multiplication operations, and an ALU 452, similar to ALU 412 of first ALU 410.1. Logic is provided that is used during separate executions of instructions VIDIDCT, VIDIQMO, and VIDIQSC.

Logic for VIDIDCT

A least significant bit of input 450.A is provided to an AND gate 459. When instruction VIDIDCT executes, the least significant bit of input 450.A is set to 0.

Logic for VIDIQMO

The output of multiplier 450, 450.C, is provided to round circuit 454, which implements the steps of 1102 and 1103, described below, using hardwired logic. Multiplexer 456 selects output 454.A from the round circuit 454 where the instruction VIDIQMO executes.

The output 454.A of multiplexer 456 is an input to ALU 452. Where output 454.A is to be incremented, in accordance with step 1104, described below, a second input to the ALU 452 is a 1.

Output 452.A from ALU 452 is provided to oddification circuit 460, which performs the operations of steps 1106 and 1107, described below, using hardwired logic. Multiplexer 462 selects the output of oddification circuit 460 when instruction VIDIQMO executes.

Logic for VIDIQSC

VIDIQSC circuit 464 receives inputs 464.A and 464.B. Input 464.B is an input to ALU 452. VIDIQSC circuit 464 performs the steps 1201-1212, described in more detail below, using hardwired logic. Multiplexer 466 selects the output from VIDIQSC circuit 464 when instruction VIDIQSC executes.

Instructions

Figures 1, 5:
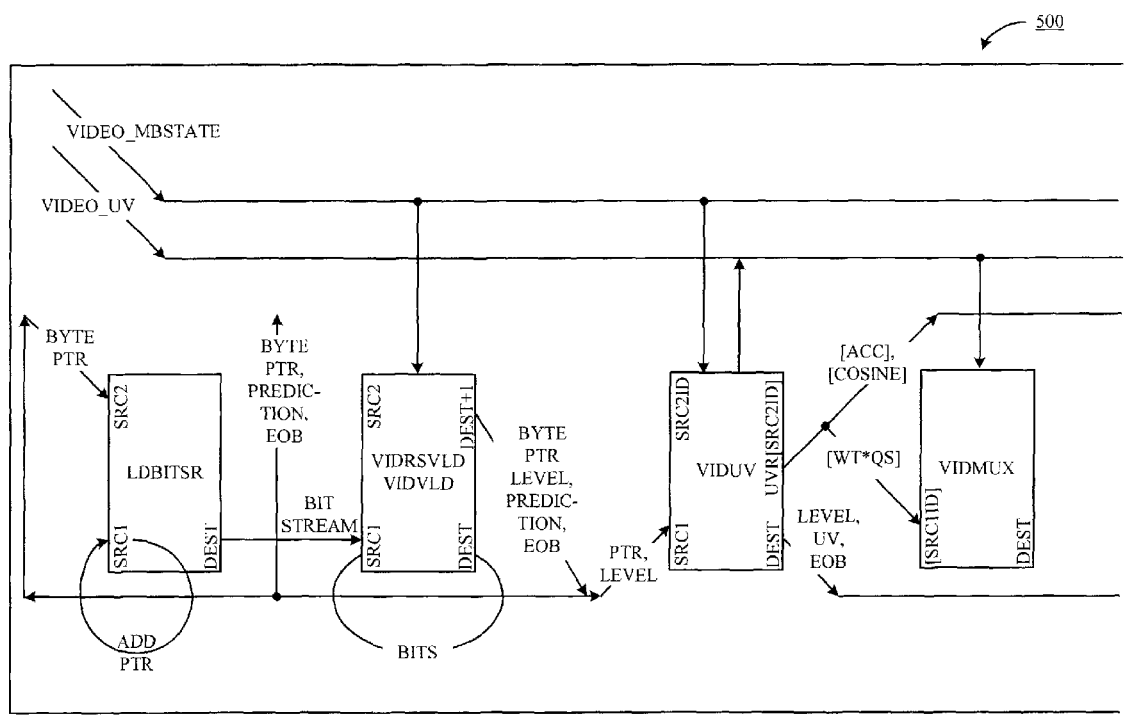
FIG. 5 provides a flow diagram of an operation of instructions of code segment 300 in accordance with an embodiment of the present invention.
Figures 2, 5:
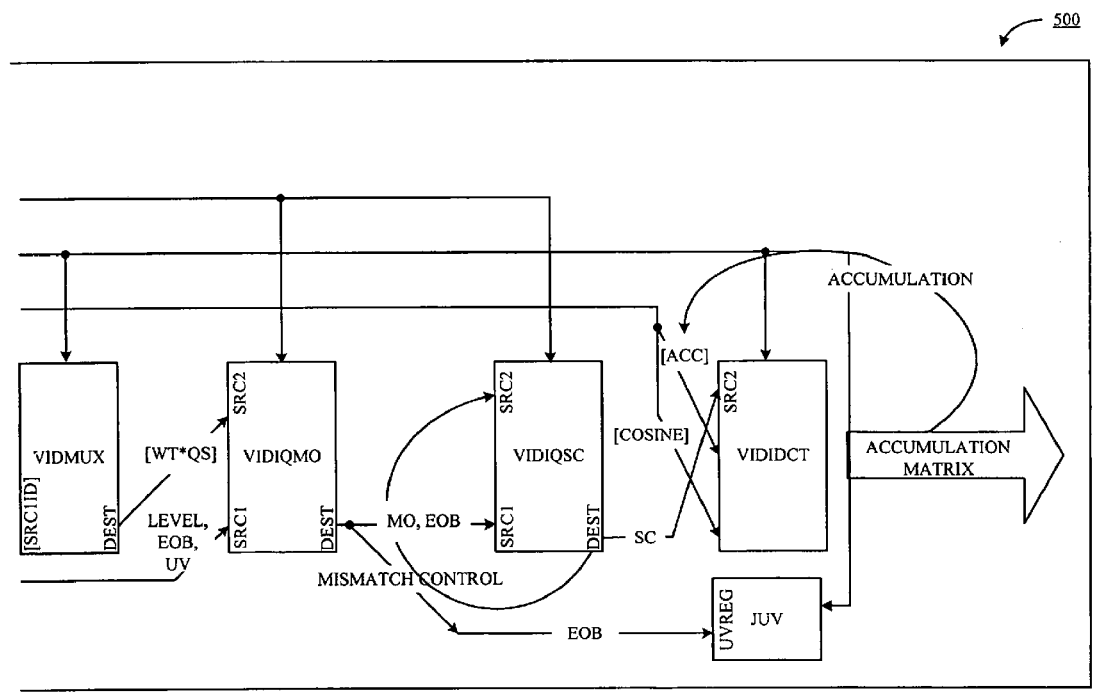

FIG. 5 provides a flow diagram of an operation of instructions of code segment 300. FIG. 5 particularly illustrates information, e.g., eob and UV, passed between instructions. The feedback and feedforward sharing of information allows for interleaved instruction operation, introduced earlier. In this embodiment, each instruction references parameters within 64 general purpose registers (FIG. 4A, item 404). The instructions thus share use of the general purpose registers, which are used by any instructions requiring explicit operands.

An alternative implementation could be to assign a distinct memory region for each instruction. However such implementation would require more memory space and more memory access hardware to each memory region than the shared general purpose registers of this embodiment. In this embodiment, only a single set of memory access circuitry are needed for the general purpose registers because all instructions share the general purpose registers. Sharing of general purpose registers further allows for sharing of all hardware or instructions required in instruction processing, e.g., state for context switching.

Further, all instructions share use of bypass and interlock control circuitry because the instructions share use of general purpose registers 404. Bypass is well known in the art as the practice of providing speculative results from one instruction to another instruction. Interlock control is well known in the art as the practice of delaying execution of an instruction that requires an unavailable result until the result is available.

Instruction LDBITSR

Figure 6A:
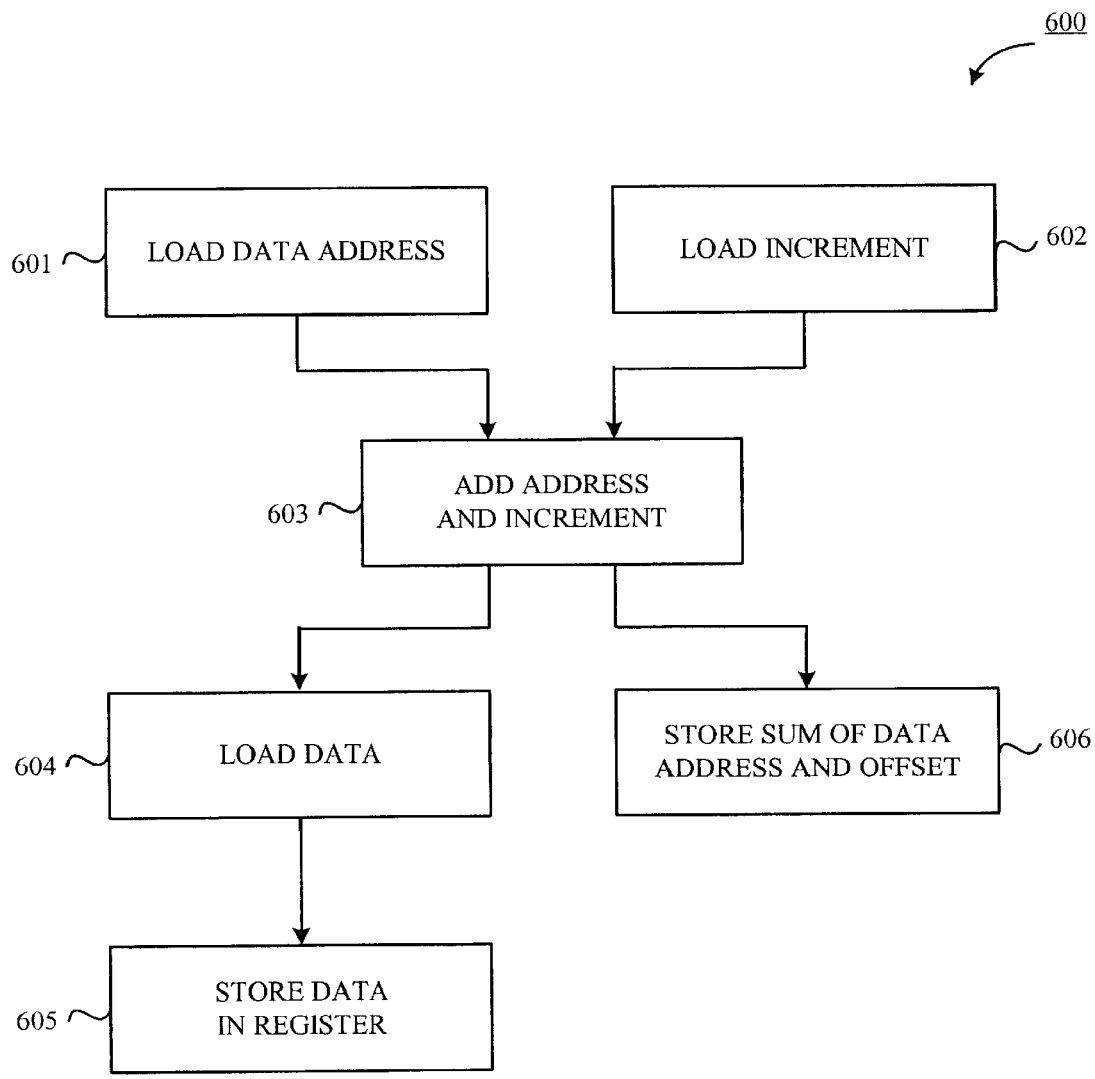
FIG. 6A depicts a flow diagram 600 showing operations specified by instruction LDBITSR (call 301) in accordance with an embodiment of the present invention.
Figure 6B:
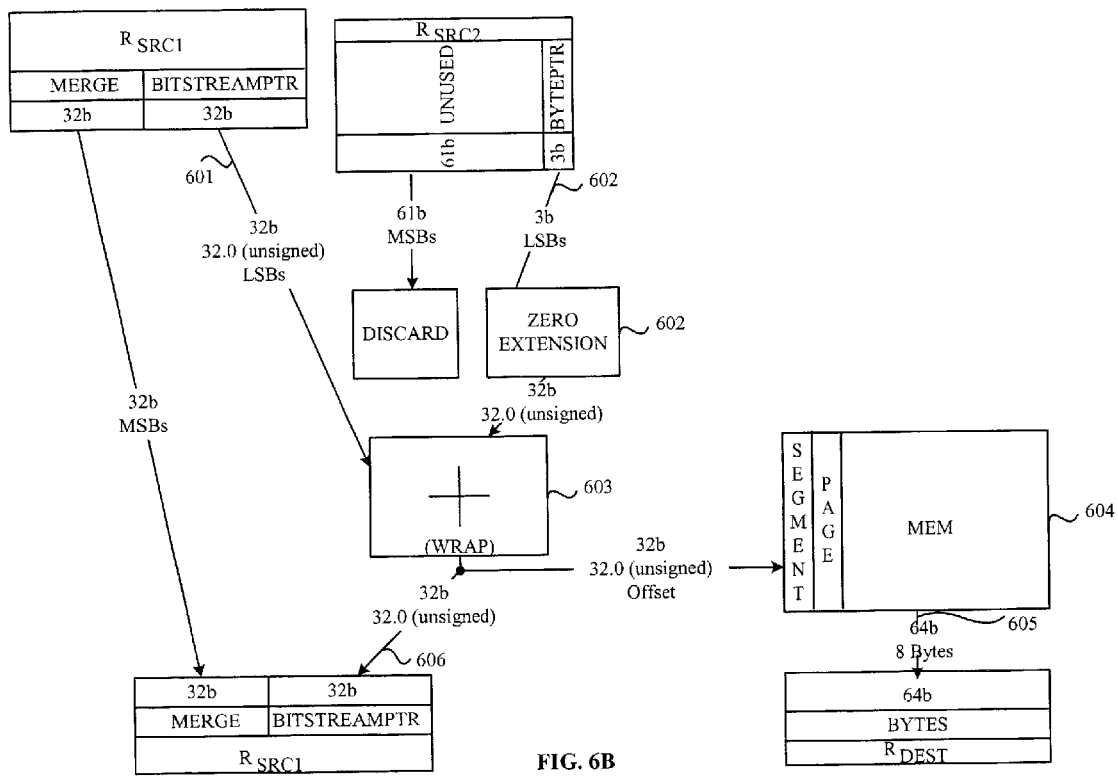
FIG. 6B schematically depicts the operation of instruction LDBITSR in accordance with an embodiment of the present invention.

Referring to FIG. 3, call 301 executes instruction LDBITSR, which fetches 64 bits of input variable-length code from an input data stream ("bitstream") from memory 490. A flow diagram 600 showing the tasks performed by instruction LDBITSR is depicted in FIG. 6A. FIG. 6B schematically depicts the operation of instruction LDBITSR. In FIG. 6B, step numbers from FIG. 6A are used to denote association between steps of FIG. 6A and schematically depicted operations of FIG. 68. Pseudo-code for instruction LDBITSR is provided in Appendix A.

In this embodiment, instruction LDBITSR is encoded as a 32-bit instruction having the following format:

TABLE 1

| 31...26 | 25...24 | 23...18 | 17...12 | 11...6 | 5...0 |
|---|---|---|---|---|---|
| 110111 | 11 | Dest | Src1 | 110011 | Src2 |

The bit pattern of bits [31:26, 25:24, 11:6] specifies instruction LDBITSR. The fields "Dest", "Src1", and "Src2" (respectively, the result destination and the operand sources of the instructions) each specify one of 64 general-purpose registers.

As shown in FIG. 6A, at step 601, the value of a variable "BitStreamPtr", which includes a 32-bit memory byte-address corresponding to the most recently retrieved 64 bits of a bitstream, is loaded from the general purpose register specified in field "Src1". The bitstream includes variable-length codes encoded under one of the MPEG standards.

In step 602, the value of a variable "BytePtr", which represents displacement to the memory byte-address specified in BitStreamPtr, is loaded from the general purpose register specified by field "Src2" of the LDBITSR instruction. In this embodiment, LDBITSR provides the 3 bit "BytePtr" to the selector device 415 described with respect to first. ALU 410.1. The zero extender device 415 of selector device 414 effectively converts "BytePtr" into a 32 bit value by tacking 0's into the 29 most significant bits, i.e., bits 31 to 3.

In step 603, variable "BitStreamPtr", the memory byte-address of the next 64 bits of variable-length codes to be processed from the bitstream, is updated by incrementing "BitStreamPtr" by "Byteptr".

In step 604, using the memory byte-address obtained in step 603, 64 bits are retrieved from the bitstream in memory 490 and stored (step 605) into the general purpose register specified by field "Dest" of the LDBITSR instruction. As shown in FIG. 5, the 64 bits (shown as "Bytes") are available to the next instruction, either VIDRSVLD or VIDVLD.

In this embodiment, reads and writes to memory 490 include conventional segmentation and paging operations common to x86 compatible memory access operations. Segmentation and paging is generally: for an input address, ADDR, using multiple lookup tables to determine an address, ADDR2, in memory associated with input address, ADDR, and storing the ADDR/ADDR2 combination in a memory cache for subsequent use and to avoid future accesses to the lookup tables.

Referring to FIG. 6, in step 606, variable "Bitstreamptr" is stored into the least significant 32 bits of the general purpose register specified by the field "Src1."

As shown in FIG. 5, the byte-address (shown as "AddPtr") is available to a subsequent execution of instruction LDBITSR.

In this embodiment, instruction LDBITSR is not executed prior to calls 310-315 because the length of the longest variable-length code is 28 bits, so that every 64 bits loaded includes at least an additional variable-length code to be decoded.

Instructions VIDRSVLD and VIDVLD

Next, as shown in FIG. 3, for a first variable-length code of the bitstream, call 302 executes instruction VIDRSVLD. For the next sequential variable-length code, call 303 executes instruction VIDVLD. Instruction VIDRSVLD of call 302 and instruction VIDVLD of call 303 are both used to align the next variable-length code in the current 64 bits of variable codes, and are thus described together here.

Figure 7A:
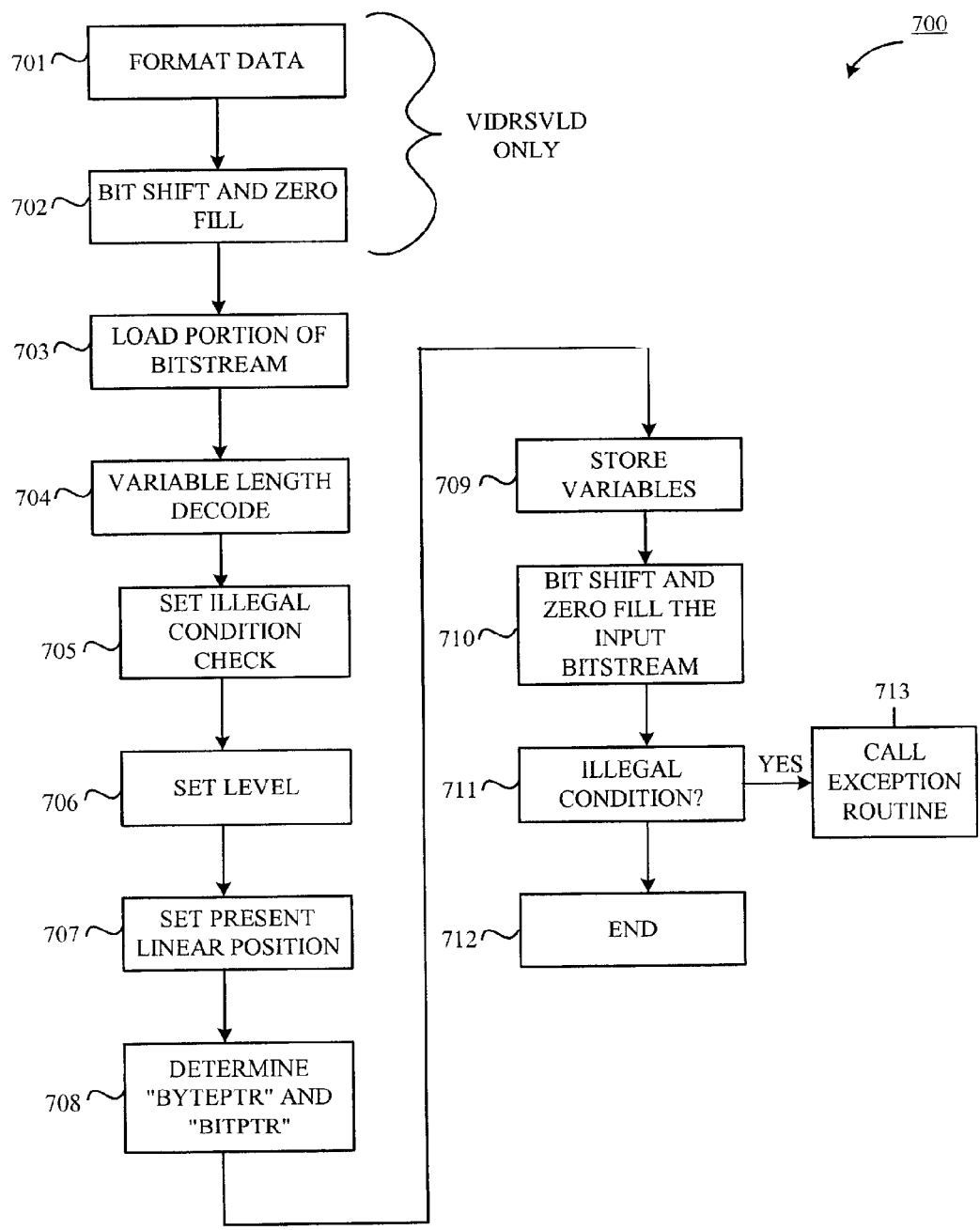
FIG. 7A depicts a flow diagram 700 illustrative of both instructions VIDRSVLD (call 302) and VIDVLD (call 303) in accordance with an embodiment of the present invention.
Figures 1, 7B:
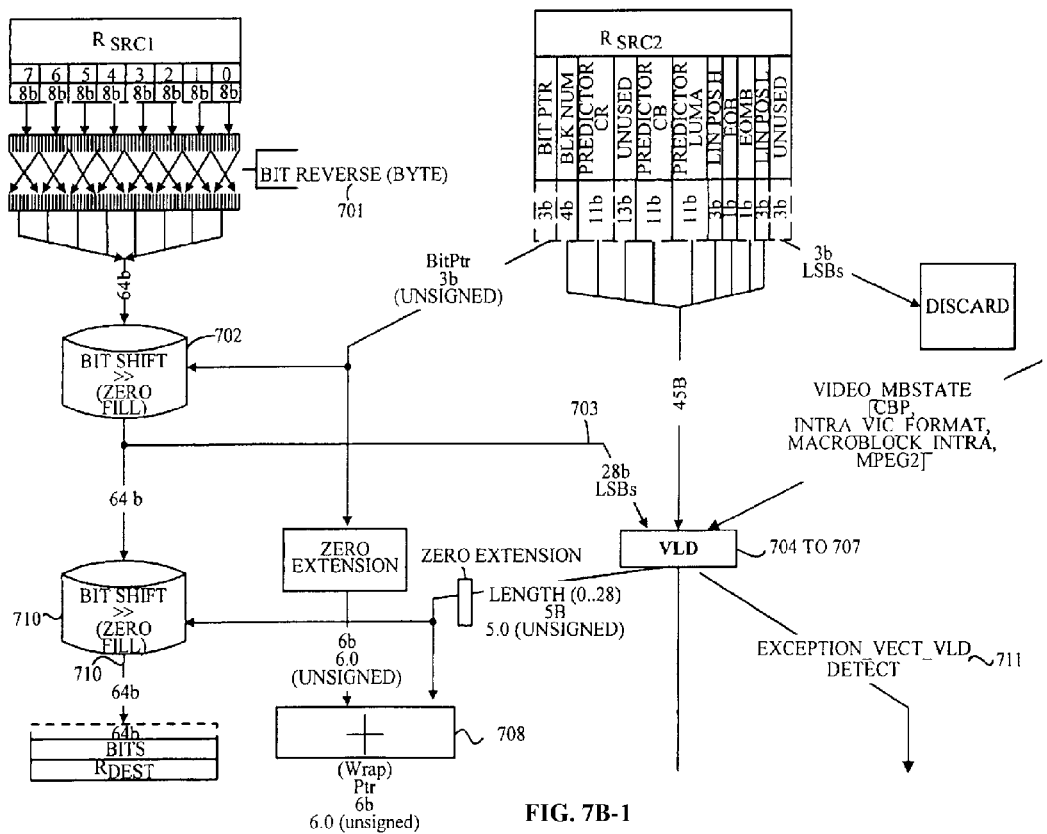
FIGS. 7B and 7C schematically depict the operations of respective instructions VIDRSVLD and VIDVLD in accordance with an embodiment of the present invention.
Figures 2, 7B:
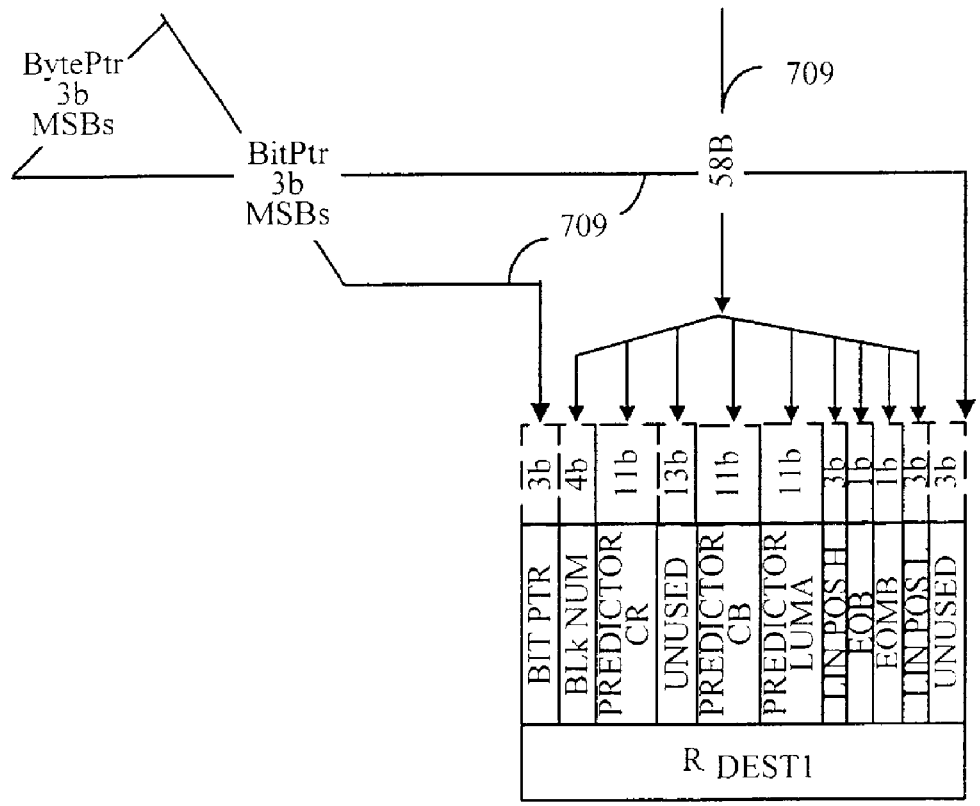
Figures 1, 7C:
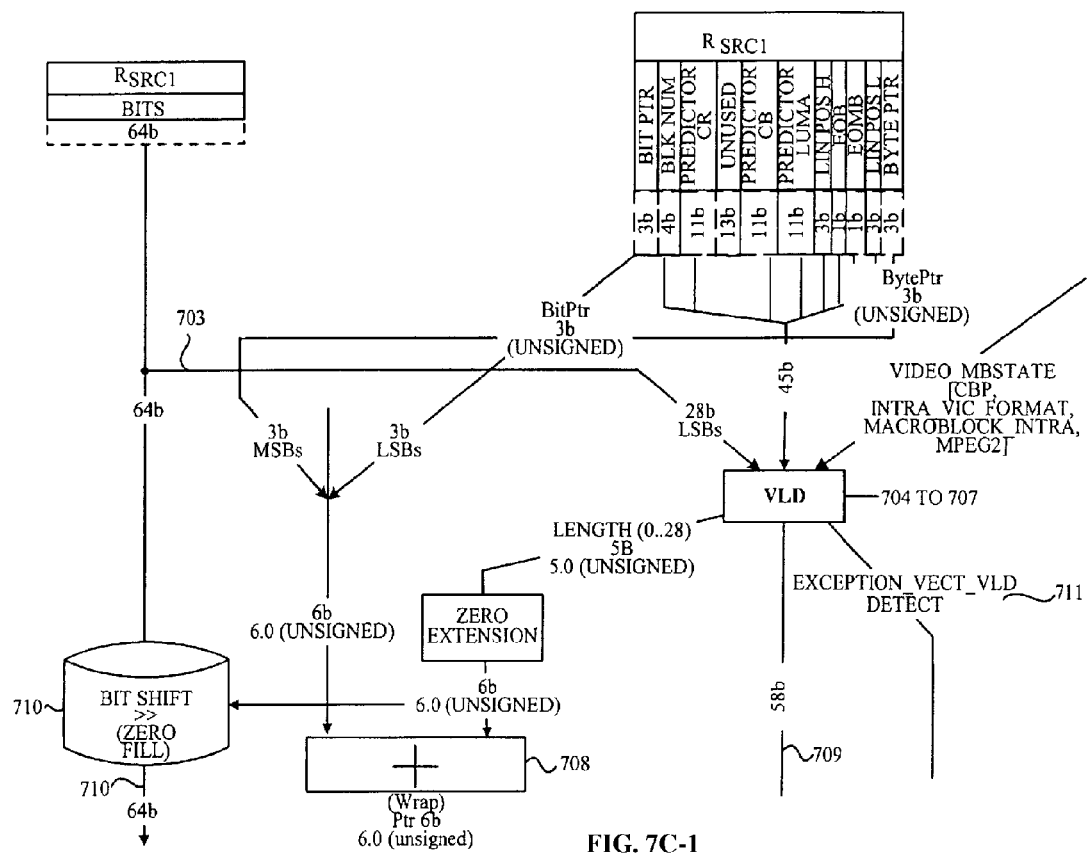
Figures 2, 7C:
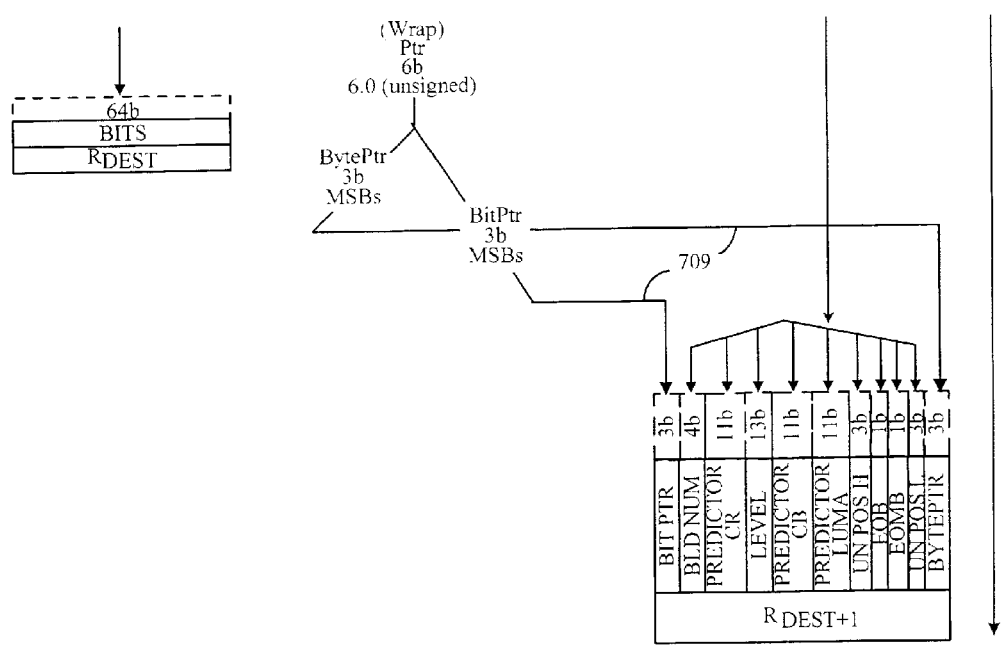

A flow diagram 700, illustrative of both instructions VIDRSVLD and VIDVLD, is shown in FIG. 7A. FIGS. 7B and 7C schematically depict the operations of respective instructions VIDRSVLD and VIDVLD. In FIGS. 7B and 7C, step numbers from FIG. 7A are used to denote association between steps of FIG. 7A and schematically depicted operations of FIGS. 7B and 7C. Steps 701-713 are performed by instruction VIDRSVLD and steps 703-713 are performed by instruction VIDVLD. FIG. 4F depicts the circuit used to execute the instructions VIDRSVLD and VIDVLD.

Table 2 depicts the encoding of instruction VIDRSVLD:

TABLE 2

| 31...26 | 25...24 | 23...18 | 17...12 | 11...6 | 5...0 |
|---|---|---|---|---|---|
| 011000 | 11 | Dest | Src1 | 011101 | Src2 |

As shown in Table 2, the bit pattern bits [32:26, 25:24, 11:6] identify the instruction VIDRSVLD. Fields "Dest", "Src1", and "Src2" specify respectively the general purpose registers for result destination and operand registers of the instruction. The encoding for instruction VIDVLD is the same as instruction VIDRSVLD, except that the bit pattern '011100' is provided at bits [11:6].

In this embodiment, instructions VIDVLD and VIDRS-VLD use VIDVLD/VIDRSVLD circuit 436 of FIG. 4F. Thus reference will be made to the circuit when used.

At step 701, bit reverser 436.1 of circuit 436 is used to perform a bit order reversal on each 8-bit byte of the 64 bits, read from the general purpose register specified by "Src1". In this embodiment, step 701 rearranges the bit at position n of each 8-bit byte to position (7−n), where n is 0 to 7.

Then, at step 702, using bit shifter 436.2, the 64 bits output from the bit reverser 436.1 is right-shifted (towards the least significant bit) by a number of bits specified in a 3-bit field "BitPtr", from the 3 most significant bits of the general purpose register specified by field "Src2" (input 436.C of FIG. 4F), in order to shift out a previously decoded symbol and to align an undecoded symbol in the least significant bits of the 64 bit output. Thus use of "BitPtr" allows a variable-length code within the 64 bits from the bit reverser 436.1 to be decoded regardless of where located in the 64 bits. Zero bits are inserted into the most significant bits, where a number of zero bits is the same as specified in "BitPtr". Bit shifter 436.2 outputs a 64 bit quantity.

In this embodiment, a multiplexer 436.3 of circuit 436 receives inputs of 1) the output from bit shifter 436.2 and 2) the 64 bits input to the bit reverser 436.1. When the instruction VIDRSVLD executes, the multiplexer 436.3 outputs input 1) and otherwise, input 2). The output of multiplexer 436.3 (436.1) is an input to MUX 434 (FIG. 4E).

In step 703, which is common to both instructions VIDRS-VLD and VIDVLD, the 28 least-significant bits of the 64 bits from multiplexer 436.3 (hereafter variable "bits") are provided to VLD circuit 436.4, discussed in more detail below. Further the 45 bits from positions 3 to 32 and 46 to 60 from the general purpose register "Src2" are provided to VLD circuit 436.4. Four bits from special purpose register "VIDEO_MBstate" (FIG. 5) are provided to VLD circuit 436.4.

Figure 8A:
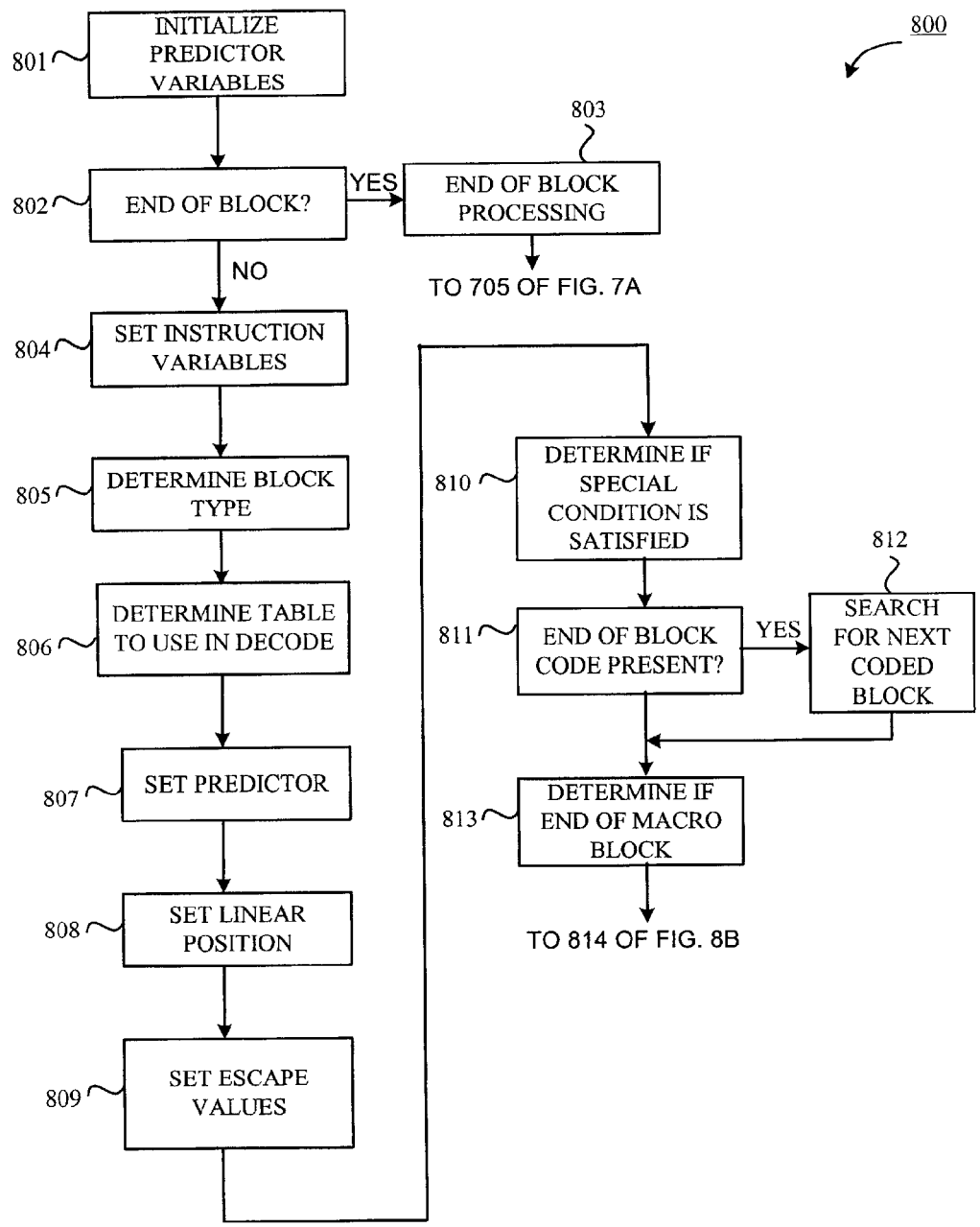
FIGS. 8A and 8B describe step 704 of FIG. 7A in further detail in accordance with an embodiment of the present invention.
Figure 8B:
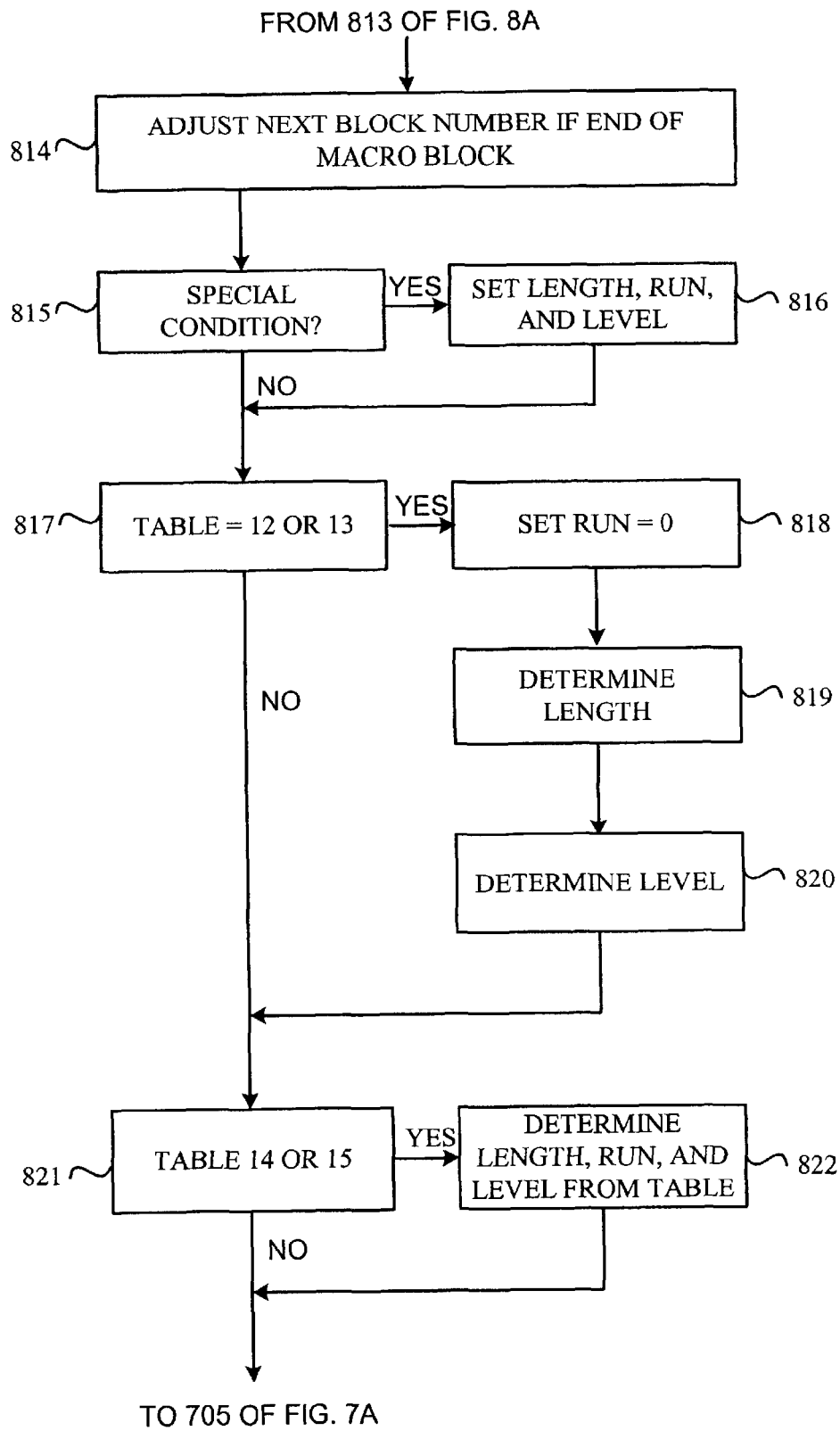

At step 704, a variable-length code decoding step in accordance with the MPEG standards is performed on "bits". In this embodiment, VLD circuit 436.4 includes a hardwired implementation of step 704. FIGS. 8A and 8B describe step 704 in further detail. Suitable pseudo-codes of step 704 as executed in instructions VIDRSVLD and VIDVLD are provided respectively in Appendices. B-1 and B-2.

The following table represents variables and sources of such variables used by VLD circuit in step 704.

| Variable name | Bits from register specified in "Src2" |
|---|---|
| BlkNum | 63 . . . 61 |
| PredictorCr | 60 . . . 57 |
| PredictorCb | 56 . . . 46 |
| PredictorLuma | 45 . . . 33 |
| LinPosH | 10 . . . 8 |
| eob | 7 |
| eomb | 6 |
| LinPosL | 5 . . . 3 |
| BytePtr | 2 . . . 0 |

As shown in FIG. 8A, at step 801, the values for variables "PredictorLumaOut", "PredictorCbOut", and "PredictorCrOut," which are DC-coefficients of I-pictures for respective luminance, blue-chrominance, and red-chrominance block types, are set to default values. If the end of the current macroblock was reached (step 802), i.e., the general purpose register specified in field "Src2" contains an asserted "eomb" flag, the values of variables "level" and "length" are both set to zero and a variable "eobOut" is set 1, to indicate the end of the current macroblock (step 803). From step 803, the program returns to step 705 of FIG. 7A.

However, if the end of the current macroblock is not reached, step 804 of FIG. 8A retrieves values of variables "mb_intra", "mpeg2", "intra_vlc_format", and "cbp" from special purpose register "Video_MBstate". The value of variable "mb_intra" indicates whether a block is from an I-picture. The value of variable "mpeg2" indicates whether a block is coded using MPEG-1 or MPEG-2 format. The value of variable "intra_vlc_format" selects a table for decoding the current variable-length code. The value of variable "cbp" indicates which blocks of the current macroblock are encoded. In this embodiment, variable "cbp" is represented by 12 bits, each bit indicating the encoding status of one of the 12 8×8 blocks. Thus, if a bit in "cbp" is set, the corresponding 8×8 block in the current macroblock is encoded. The following table depicts the block type each bit of "cbp" represents:

"Y", "U" and "V". "Y", "U", and "V" stand for, respectively, luminance, blue chrominance, and red-chrominance.

| Bit Number | Corresponding block type |
|---|---|
| 0 | Y |
| 1 | Y |
| 2 | Y |
| 3 | Y |
| 4 | U |
| 5 | V |
| 6 | U |
| 7 | V |
| 8 | U |
| 9 | V |
| 10 | U |
| 11 | V |

In step 804, the value of variable "intra_dc" is also set. When set, the current variable-length code encodes a DC-coefficient of an intra-coded block (i.e., a block in an I-picture). The value of variable "intra_dc" is determined from the values of variables "eobIn" and "mb_intra", which indicate whether the last variable-length code of the previous block is an end-of-block and whether the present variable-length code is intra-coded, respectively.

In step 805, the block type of the present block (i.e., luminance, red-chrominance, or blue-chrominance) is identified, and assigned as a value to a variable "cc". The value (0-11) of variable "BlkNumIn"-indicates which of the 12 8×8 blocks of a macroblock is currently being decoded.

In step 806, a table is selected based on the block type then the value of variable "intra_vlc_format". In this embodiment, tables 12, 13, 14, or 15 are provided. Look-up table 12 is used for DC-coefficients of an intra-coded luminance block. Look-up table 13 is used for DC-coefficients in intra-coded chrominance blocks. Look-up table 15 is used for non-DC coefficients that are coded in I-pictures under the MPEG-2 standard. Look-up table 14 is used for decoding all other types of non-DC coefficients.

In step 807, based on the block type (i.e., value of variable "cc"), a predictor is selected. A predictor is the most recently output "level" value for the current block type. In step 808, the linear position of the variable-length code is established. The linear position is the position, in the zigzag scanned list, of the non-zero coefficient encoded in the current variable-length code. Thus, variable "LinPosIn" can take values from 0 to 63. In step 809, escape values are set. Escape values are variable-length codes that correspond to uncommon runs and levels. To limit the maximum length of the variable length codes to 28 bits in length, the MPEG standards define certain bit patterns as escape codes to allow special exception processing, described in more detail later, when uncommon runs and levels not assigned a variable-length code occur (see step 816). The value of variable "esc" is 1 when bits [0:5] have bit pattern 0000 01 for a level which is not a DC-coefficient. A second escape pattern is signaled when variable "esc28b" has the bit pattern for bits [13:19] which is '000 00.

In step 810, the variable-length decoder checks for conditions that require special handling, by examining certain variables for special bit patterns. For example, where the least significant bit of the value for variable "bits" is a 1 and the table 14 is selected (the current variable-length code corresponds to a DC-coefficient) and the value of variable "note3" is set to 1. Reference to the value of variable "note3" provides a shorthand for representing a common variable-length code with less bits. The technique is defined in the MPEG standard.

In step 811, if the current variable-length code is an "end-of-block" code, then if the selected table is table 14, then variables "B14eob" is set to 1, else if the selected table is table 15, then "B15eob" is set to 1. The value of variable "eobOut" is set to 1 when either of variables "B14eob" or "B15eob" are 1. In step 812, if the current variable-length code is an end-of-block symbol, the variable-length code decoder searches for the next coded block. In step 813, if the next coded block is not found, the end of the current macroblock is reached. If the next coded block is found, in step 814 (FIG. 8B), the variable "BlkNumOut" is set to the index of the next coded block.

In step 815, the variable-length code decoder checks if the special condition specified in the escape codes of step 809 are satisfied. If the current variable-length codes matches any of the escape bit patterns or special conditions (i.e., "esc", "esc28b", "b14eob", "B15eob" and "note3"), in step 816, the values of variables "length", "run", and "level" are obtained by special processing, rather than table look-up in steps 817-824 described below. The following table depicts the values of "length", "run", and "level" for these special conditions, according to the MPEG standards. (Bit positions are shown as subscript).

| Condition(s) | "length" | "run" | "level" |
|---|---|---|---|
| "note3" = 1 | 2 | 0 | $-1$ if "bits$_0$" is 1; 1 otherwise |
| "B14eob" | 2 | 0 | 0 |
| "B15eob" | 4 | 0 | 0 |
| "esc" = 1 AND "mpeg2" = 1 | 24 | "bits$_{6\ldots11}$" | "bits$_{12\ldots23}$" |
| "esc28b" = 1 | 28 | "bits$_{6\ldots11}$" | $(-256 *$ "bits$_{12}$"$) +$ "bits$_{20\ldots27}$" |
| "esc" = 1 | 20 | "bit$_{6\ldots11}$" | $(-128 *$ "bits$_{12}$"$) +$ "bits$_{13\ldots19}$" |

Otherwise, in step 817, a table look-up technique is used to obtain the decoded "length", "run" and "level" values according to the selected one of tables 12, 13, 14, or 15, which are provided as in Appendices F-1 to F-4.

In step 818, if the value of variable "table" is 12 or 13, i.e., the current variable-length code encodes either a respective luminance or chrominance DC-coefficient, steps 819-820 (a) set the value of variable "run" to 0 (step 819), (b) determine from the selected table the length of the variable-length code (step 820), and (c) calculate the corresponding DC-level difference encoded in the variable-length code (step 821). (This DC-level difference is added subsequently to the previous DC-coefficient of the same type to obtain the DC-coefficient, in accordance with MPEG standard).

In step 821, if look-up table 14 or 15 is used, i.e., the current variable-length code encodes an run-level pair, step 822 looks up the selected table to determine the length of the variable length code, to determine the encoded "run" and "level" values, in accordance with the MPEG standards. Tables 14 and 15 are shown in Appendices F-2 to F-4.

In this embodiment, the table look-up functions of steps 819, 820 and 822 are implemented in hardware. In the software MPEG decoding technique of the prior art, approximately 30 instructions were used to carry out the decode. Thus, considerable time-savings result by hardwiring the table look up function.

Referring next to step 705 of FIG. 7A. The value of variable "escLevel" is set equal to the value of variable "level". In this embodiment, VLD circuit 436.4 of FIG. 4F includes a hardwired implementation of step 705. If the value of variable "escLevel" is an illegal value, an exception "Exception_VECT_VLD," described below, is triggered to invoke error-handling mechanisms.

Next, in step 706, the final value for variable "level" is set for each variable-length code. For a DC-coefficient of an I-picture, the level difference is summed to the value of the predictor variable "pred". For non-DC coefficients, if the variable-length code is not an I-picture, the final level value is twice "QFS" (the "level" value retrieved from the table) plus one or minus one, depending on whether "QFS" is negative or not. In this embodiment, VLD circuit 436.4 of FIG. 4F includes a hardwired implementation of step 706.

In step 707, the linear position of the next coefficient in the zigzag scanned list is set. Where the variable-length code is the first in a block and not an end-of-block code, the next linear position is simply the "run" value. Otherwise, where the variable-length code is not an end-of-block code, the present linear position is the present linear position (i.e., the value of variable "LinPosIn") plus "run" and 1. If the present variable-length code is end-of-block code, the present linear position is set to 0 where the previous linear position was 63, or 63 otherwise. In this embodiment, VLD circuit 436.4 of FIG. 4F includes a hardwired implementation of step 707.

In step 708, the variables "BytePtr" and "BitPtr" are concatenated (input 436.F), with "BytePtr" as the most significant bits, and added to a 6 bit version of "length". Variable "BitPtr" (input 436.D) is expanded to 6 bits (436.H) using circuit 436.5. The 6 bit version of the variable "BitPtr" and the concatenated "BytePtr" and "BitPtr" (436.F) are provided to multiplexer 436.7, which selects the 6 bit version of the variable "BitPtr" (436.H) when instruction VIDRSVLD executes. The output of MUX 436.7 is an input to adder 436.8.

Variable "length" from VLD circuit 436.4 (input 436.E) is converted into a 6 bit version using zero extender 436.6. The 6 bit version of "length" (input 436.G) is an input to adder 436.8 and to MUX 435 (FIG. 4E).

With respect to the output sum from adder 436.8, the most-significant 3 bits and the least significant 3 bits are assigned, respectively, as values for variables "BytePtr" and "BitPtr". This step (708) updates variables "BytePtr" and "BitPtr" to point to the beginning byte and the beginning bit of the next variable-length code for use in instructions LDBITSR, VIDVLD and VIDRSVLD.

The output 436.K from the VLD circuit 436.4 and the output 436.L from adder 436.8 are combined into a 64 bit value ("VLD output") (436.J of FIG. 4F), where "BytePtr" and "BitPtr" occupy the respective 3 most significant and 3 least significant bits of the 64 bit value. The VLD output is fed into multiplexer 446 (FIG. 4E).

In step 709, VLD output is stored in general purpose register "Dest+1". Variables stored include: "BytePtr", "BitPtr", "level", "BlkNum", "eob", "eomb", "LinPosH", "LinPosL", "PredictorLumaOut", "PredictorCbOut", and "PredictorCrOut".

As shown in FIG. 5, variable "BytePtr" is available for use in a subsequent execution of instruction LDBITSR. Variables "BytePtr" (shown as "Ptr"), "eob", and prediction variables ("PredictorLumaOut", "PredictorCbOut", "PredictorCrOut") are available for use in a subsequent execution of instructions VIDRSVLD or VIDVLD. Variables "BytePtr" and "level" are available to instruction VIDUV.

Referring to FIG. 7A, in step 710, the 64 bits retrieved from the bit stream in the general purpose register specified by field "Src1" of the LDBITSR instruction is further right-shifted using shifter device 414, with a zero replacing each shifted bit, where the number of bit positions shifted is equal to "length". The resulting shifted bits are stored in the general register specified by field "Dest". The shifted bits are available for use in the next execution of instruction VIDRSVLD or VIDVLD (shown as "Bits" in FIG. 5).

In step 711, the variable-length code decoder checks for any error or exception conditions that may have arisen during encoding. Table 5 depicts possible error conditions:

TABLE 5

| condition number | pseudo code variable condition |
|---|---|
| 1 | vlc_length = "NoCode" (0 length code) |
| 2 | LinPosOut > 63 (end of block) |
| 3 | intra_dc AND ((QFS < 0) OR (QFS > 2047))) (DC value out of bounds) |
| 4 | mpeg2 AND esc AND ((escLevel = 0) (MPEG-2 escape condition) |
| 5 | (escLevel = −2048)) |
| 6 | NOT mpeg2 AND esc AND ((escLevel = 0) (MPEG-1 escape condition) |
| 7 | escLevel = −256 |
| 8 | esc28b AND ((escLevel < 128) OR (escLevel > −128)) (escape condition, uncoded run/level) |

Where an error or exception condition exists, exception routine, Exception_VECT_VLD is called.

In this embodiment, execution of "Exception_VECT_VLD" includes three stages: 1) preface, 2) exception execution, and 3) return from exception (RFE). Preface includes 1) storing the current execution information, e.g., program counter and status word, into a hardware stack, 2) completing side-effects.

Next, exception execution of the Exception_VECT_VLD includes: 1) assigning a run and level to the variable length code, 2) discarding from the bitstream an illegal code, or 3) indicating that an error is found in the bit stream. Action 1) may be performed for example in conditions 4-8. Conditions 4-8 in Table 5 generally correspond to uncommon run and level pairs for which encoding requires more than 28 bits. Action 3) is performed for example when an exceptional condition has recurred more than a predetermined number of times. Thus the Exception_VECT_VLD chooses to complete the triggering instruction (ignore the triggering event) or fix the triggering event and restart the triggering instruction using the fixed event.

Next, RFE instruction restores the program counter and status word and resume execution of the instruction, in accordance with the Exception_VECT_VLD choice.

Instruction VIDUV

Figure 9A:
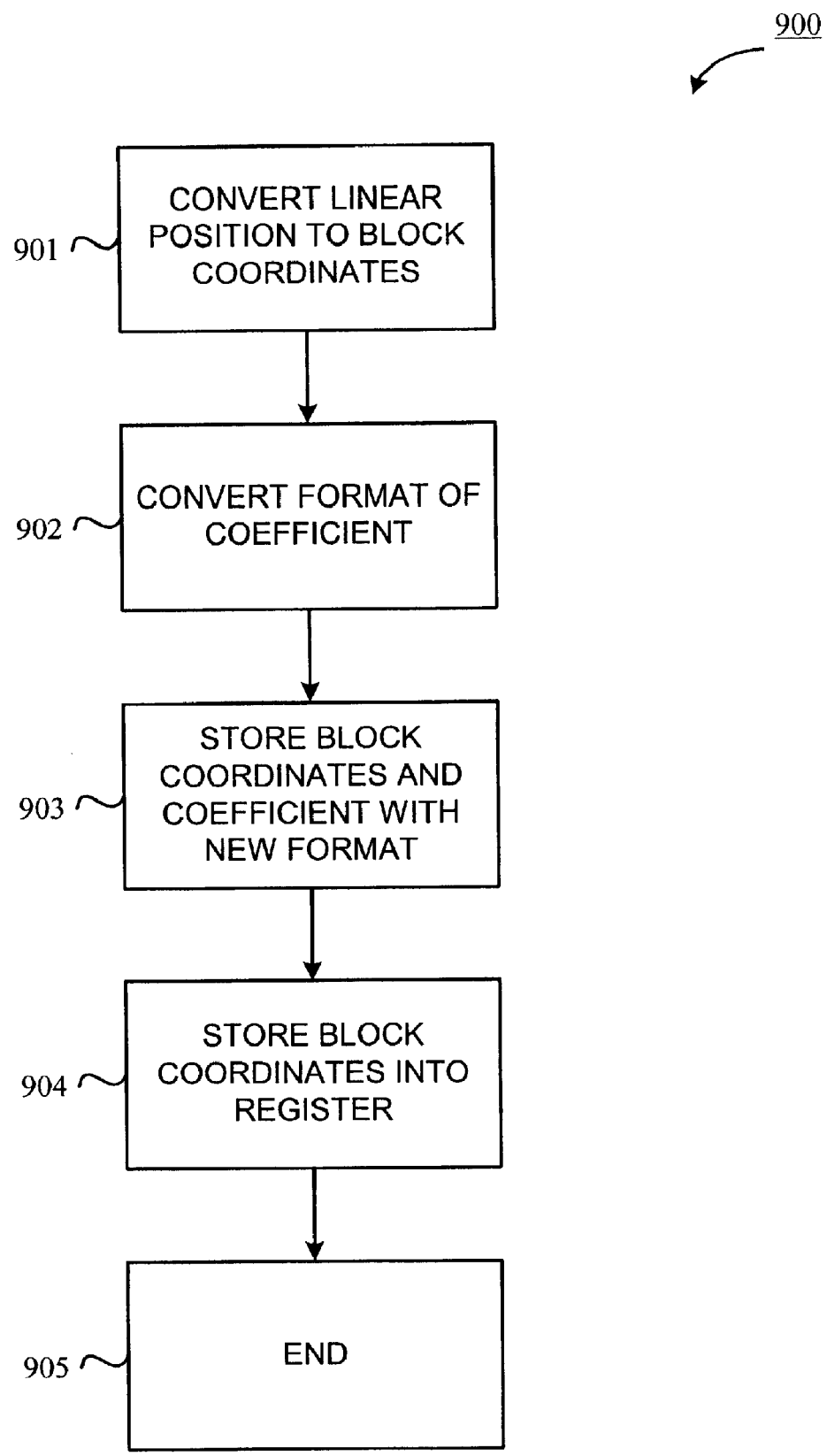
FIG. 9A depicts a flow diagram 900 of instruction VIDUV (call 304) in accordance with an embodiment of the present invention.
Figure 9B:
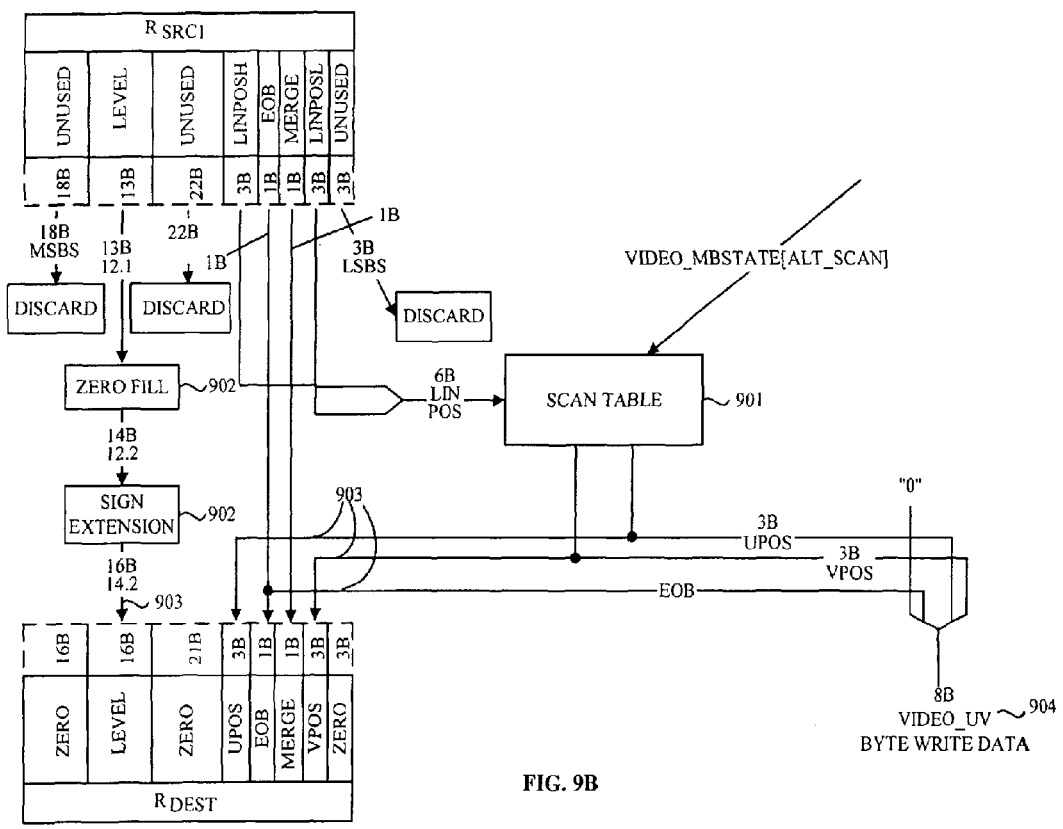
FIG. 9B schematically depicts the operation of instruction VIDUV in accordance with an embodiment of the present invention.

Referring back to FIG. 3, at call 304 instruction VIDUV is executed. FIG. 9A depicts a flow diagram 900 of instruction VIDUV (call 304). FIG. 9B schematically depicts a bit level flow diagram of instruction VIDUV. In FIG. 9B, step numbers from FIG. 9A are used to denote association between steps of FIG. 9A and schematically depicted operations of FIG. 9B. Pseudocode for instruction VIDUV is provided in Appendix C.

Table 6 depicts the encoding of instruction VIDUV:

TABLE 6

| 31...26 | 25...24 | 23...18 | 17...12 | 11...6 | 5...3 | 2...0 |
|---|---|---|---|---|---|---|
| 011000 | 11 | Dest | Src1 | 011011 | 000 | UVReg |

Bits [31:26, 25:24, 11:6, and 5:3] specify instruction VIDUV. Fields "Dest" and "Src1" each specify one of 64 general purpose registers for use as result destination and operand source for the instruction. Field "UVReg" specifies a byte in a special purpose register Video_UV.

Figure 1:
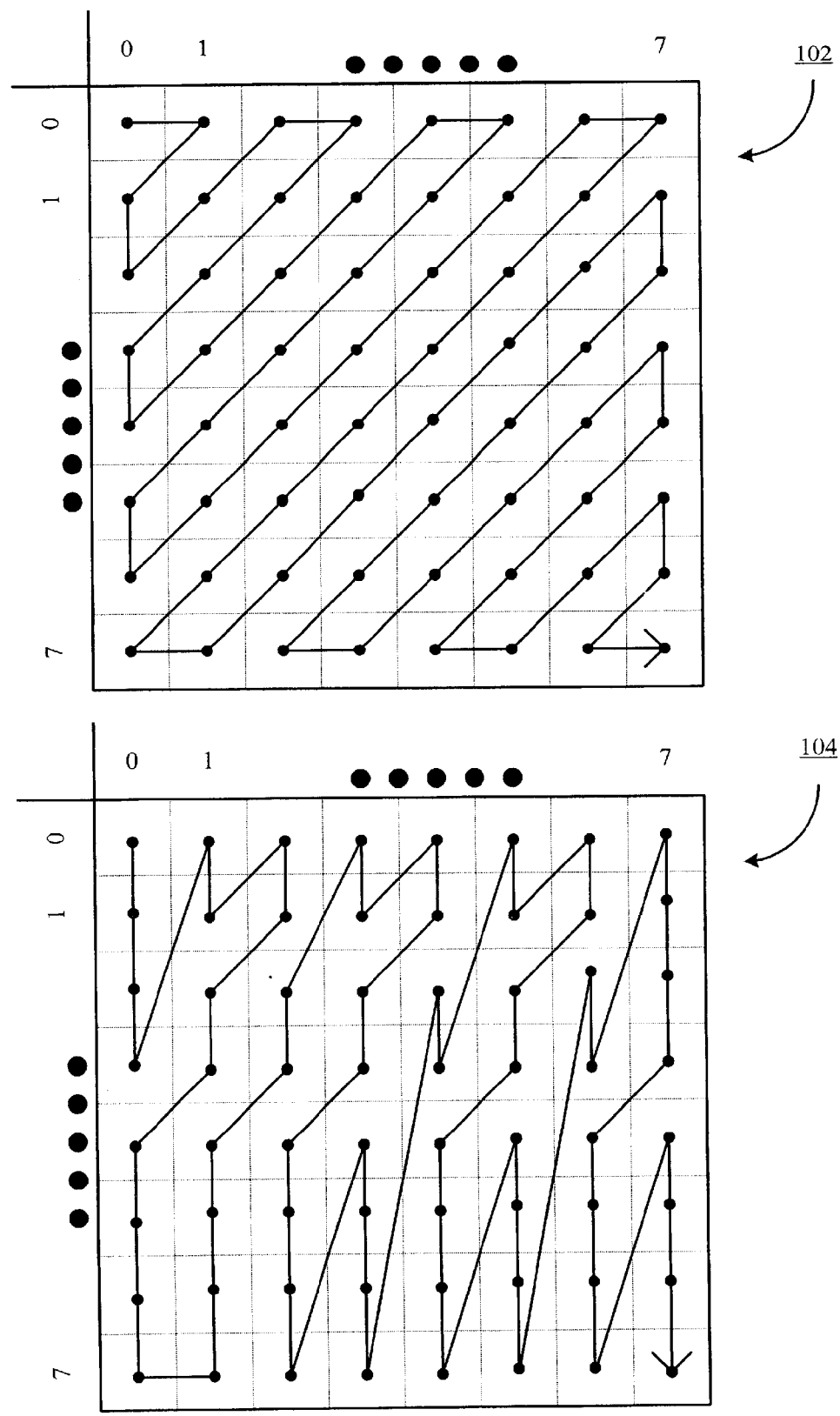
FIG. 1 depicts two zigzag scanning orders as specified under MPEG-2.

In step 901, function ScanTable converts a linear position of a variable-length code as represented by variables "LinPosH", "LinPosL", into block coordinates ("UPos", "VPos") within an 8×8 block. FIG. 1 depicts the two possible scan orders for converting linear position, "LinPosH", "LinPosL", into coordinates ("UPos", "VPos").

In this embodiment, in step 901, the VIDUV instruction provides "LinPosH" and "LinPosL", each 3 bits, to the scan table circuit 443.2, introduced with respect to VIDUV circuit 443 (FIG. 4G). The scan table circuit 443.2 converts the linear position, "LinPosH" and "LinPosL", into coordinates "Upon" and "Vpos" according to the conversion table of Appendix G. For a zigzag pattern 102 (FIG. 1), the middle column is used, and for a zigzag pattern 104 (FIG. 1), the right most column is used. The scan table circuit 443.2 outputs "Upos" and "Vpos", each being 3 bits, to output format converter 443.4.

In step 902, the 13-bit variable "LevelIn," having 12 value bits and 1 sign bit is converted into a 16-bit value variable "Level", by 2-bits of sign extension and appending a '0' bit at the least significant end.

In this embodiment, in step 902, the VIDUV instruction provides the 13-bit variable "LevelIn" to the format converter 443.3 of VIDUV circuit 443 (FIG. 4G), which outputs the 16 bit value, "Level", having the following properties: 1) the least significant bit is 0; 2) the two most significant bits are each set to the most significant bit of "LevelIn"; 3) "Level$_{13...1}$" is set to "LevelIn".

In step 903, the coordinates ("UPos", "VPos"), 16 bit "Level", and variables "eob" and "merge" from general purpose register "Src1" are stored in register "Dest". In an embodiment, steps 902 and 903 can be performed in parallel.

In this embodiment, in step 903, instruction VIDUV uses output format converter of 443.4 of second ALU 410.2 (FIG. 4G). Output format converter generates a 64 bit value, having the following properties:

| Bit(s) | Content(s) |
|---|---|
| 63...48 | 0 |
| 47...32 | "Level" |
| 31...11 | 0 |
| 10...8 | "UPos" |
| 7 | eob |
| 6 | merge |

-continued

| Bit(s) | Content(s) |
|---|---|
| 5...3 | "VPos" |
| 2...0 | 0. |

Thereby VIDUV circuit 443 outputs a 64 bit value.

In step 904, one byte of information ("coordinate information") including coordinates ("UPos", "VPos") and variable "eob", which indicates whether a coordinate corresponds to an end-of-block code, are stored in a field of special purpose register "Video_UV". The "Video_UV" consists of 8 bytes, that is 1 byte of information for each of 8 coordinates. The "UVReg" field identifies which of the 8 bytes are modified by instruction VIDUV.

As shown in FIG. 5, the one byte of information in special purpose register "Video_UV" is available to other instructions including VIDMUX and VIDIDCT. As shown, variables "level", "UPos", "VPos", and "eob" are provided for use by instruction VIDIQMO. Variables "UPos", "VPos" (shown respectively as [ACC], [Cosine], and [Wt*QS] in FIG. 5) are provided for use in instructions VIDMUX and VIDIDCT.

Instruction VIDMUX

Figure 10:
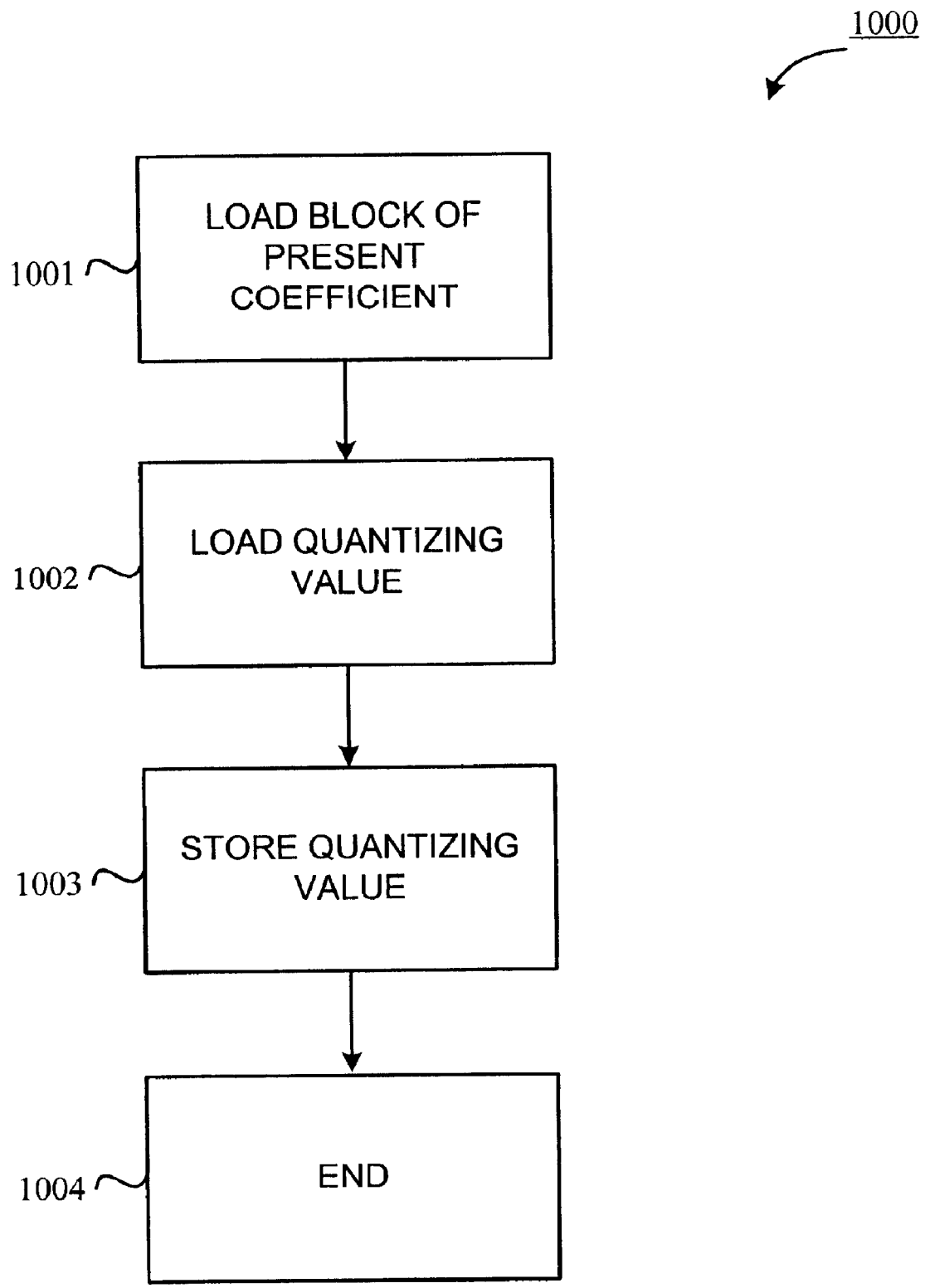
FIG. 10 shows a flow diagram 1000 of instruction VIDMUX (call 305) in accordance with an embodiment of the present invention.

Referring to FIG. 3, at call 305, instruction VIDMUX is executed. FIG. 10 shows a flow diagram 1000 of instruction VIDMUX. Pseudocode for instruction VIDMUX is provided in Appendix D. Table 7 depicts the encoding of instruction VIDMUX.

TABLE 7

| 31...26 | 25...24 | 23...18 | 17...16 | 15 | 14...12 | 11...6 | 5...0 |
|---|---|---|---|---|---|---|---|
| 110111 | 11 | Dest | Src1ID | 0 | UVReg | 100100 | 000000 |

Bits [31:26, 25:24, 11:6, and 5:0] specify the VIDMUX instruction. Fields "Dest" and "UVReg" specify, respectively, the general purpose register used in the instruction as result destination and a byte in the special purpose register "Video_UV". Field "Src1ID" includes a "base address" into a general purpose register file, from which a general purpose register number can be calculated.

In step 1001, block coordinates (u,v) for the coefficient decoded in VIDRSVLD or VIDVLD (call 302 or 303) are loaded. Bits [2:0] of field "UVReg" specifies which 8-bit identification segment in 64 bit-register Video_UV includes coordinate information.

In step 1002, directive {MuxData:=GPR[Src1ID||$u_0$||$v_{2...0}$]} loads the contents of the general purpose register, specified by the concatenation of "SrcID", $u_0$, and $v_{2...0}$, that includes the dequantization constant associated with the coefficient having block coordinates (u, v). Variable "Scr1ID" selects a range of 16 registers and the concatenation of $u_0$ and $v_{2...0}$ identifies a specific register among the 16 registers. Table 8 depicts values of Src1ID and the corresponding general purpose register selected by Src1ID.

TABLE 8

| Src1ID | general purpose register base address |
|---|---|
| 0 | R0 |
| 1 | R16 |
| 2 | R32 |
| 3 | R48 |

Thereby variable "MuxData" represents a 64 bit quantity that includes the desired dequantization constant, variable "Wt*QS". A variable "MuxControl", being the 2 most significant bits of coordinate "u" specifies which 16-bit region, i.e., either bits 0-15, 16-31, 32-47, or 48-63, of variable "MuxData" is the desired dequantization constant, variable "Wt*QS".

Instruction VIDMUX next utilizes zero stuffer device 416 of FIG. 4D. A 64 bit input signal 416.A to zero stuffer device 416 is "MuxData" and signal "select" is variable "MuxControl". Zero stuffer device 416 selects the 16 bits specified by "MuxControl" in "MuxData"; stores the 16 bits in a 16-bit region, i.e., either bits 0-15, 16-31, 32-47, or 48-63, specified by "MuxControl", where all bits but the 16-bit region are zero; and outputs a 64 bit value.

In step 1003, the 64 bit value output from zero stuffer 416 is stored into the general purpose register specified by field "Dest".

Referring to FIG. 5, the 16-bit dequantizing constant (shown as Wt*QS), is provided for use in instruction VIDIQMO.

Instruction VIDIQMO

Figure 11A:
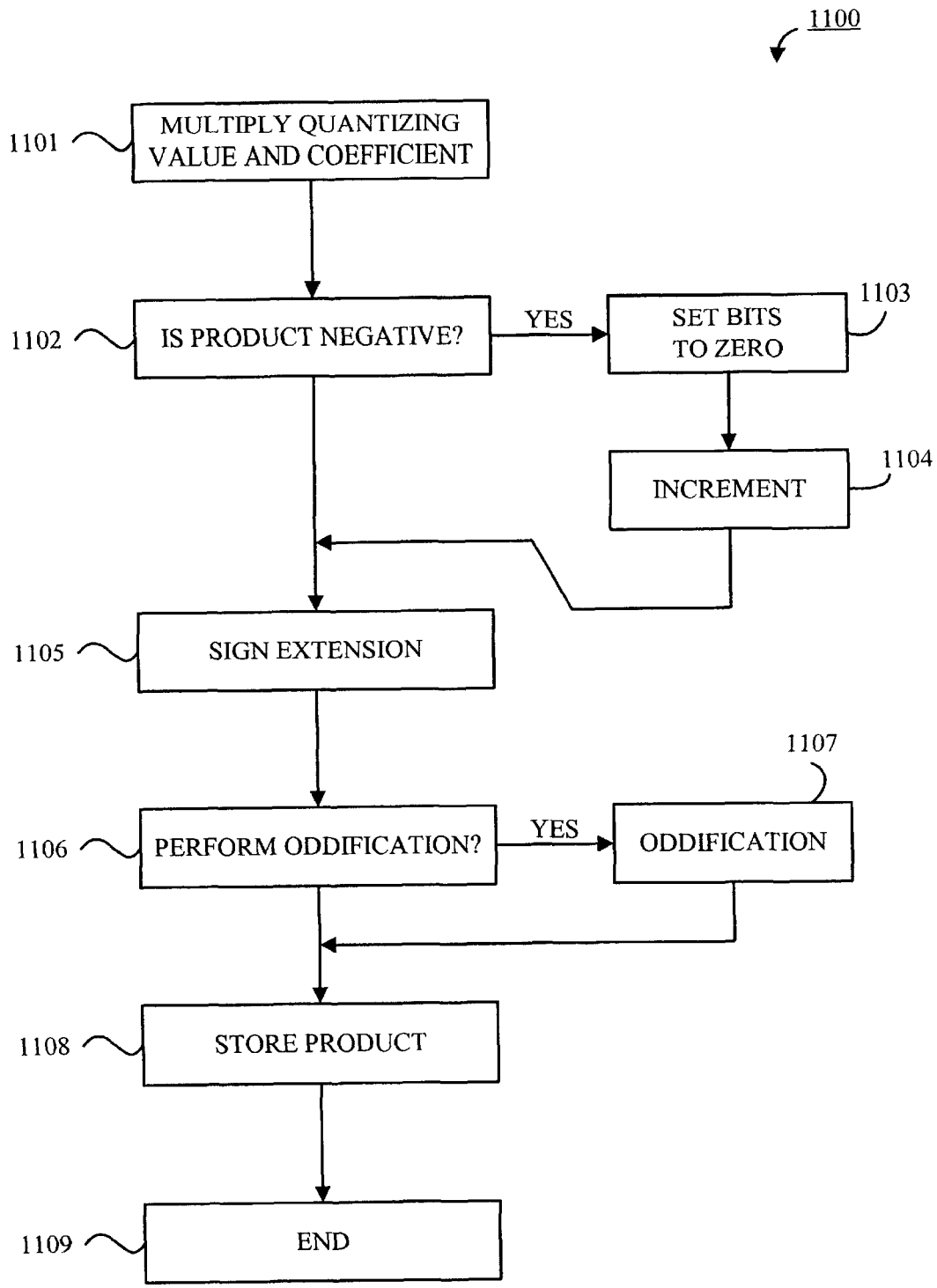
FIG. 11A depicts a flow diagram 1100 of instruction VIDIQMO (call 306) in accordance with an embodiment of the present invention.
Figures 1, 11B:
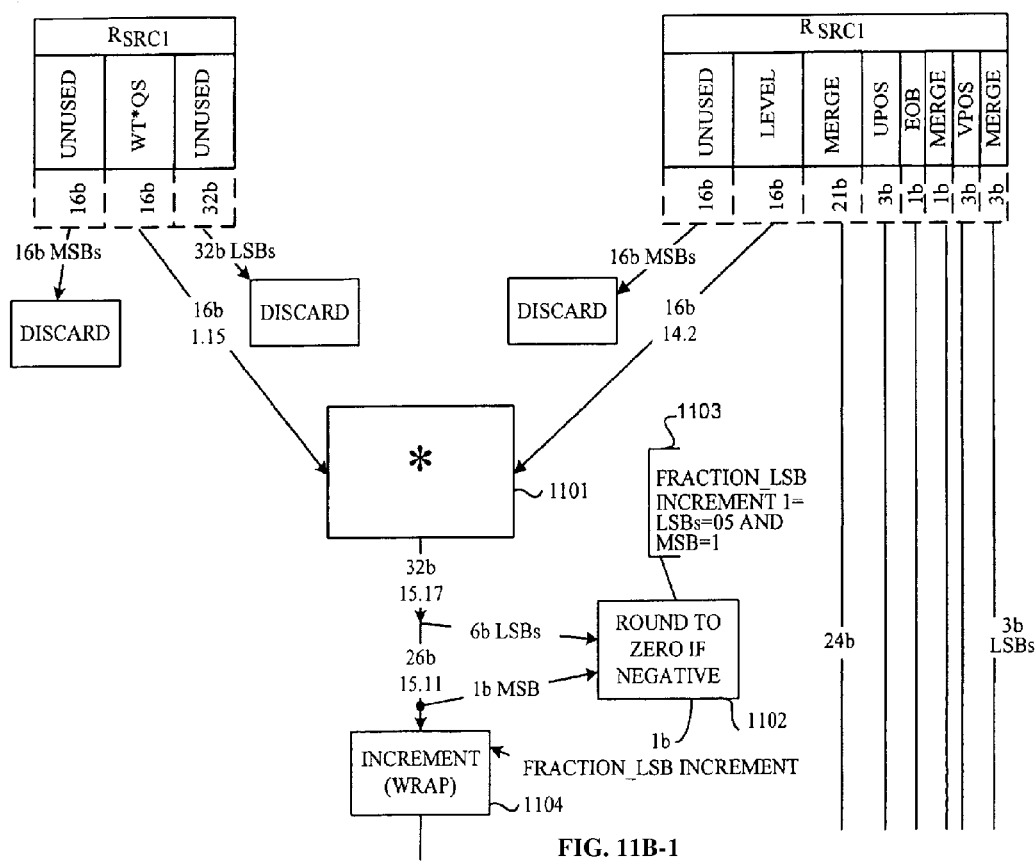
FIG. 11B schematically depicts the operation of instruction VIDIQMO in accordance with an embodiment of the present invention.
Figures 2, 11B:
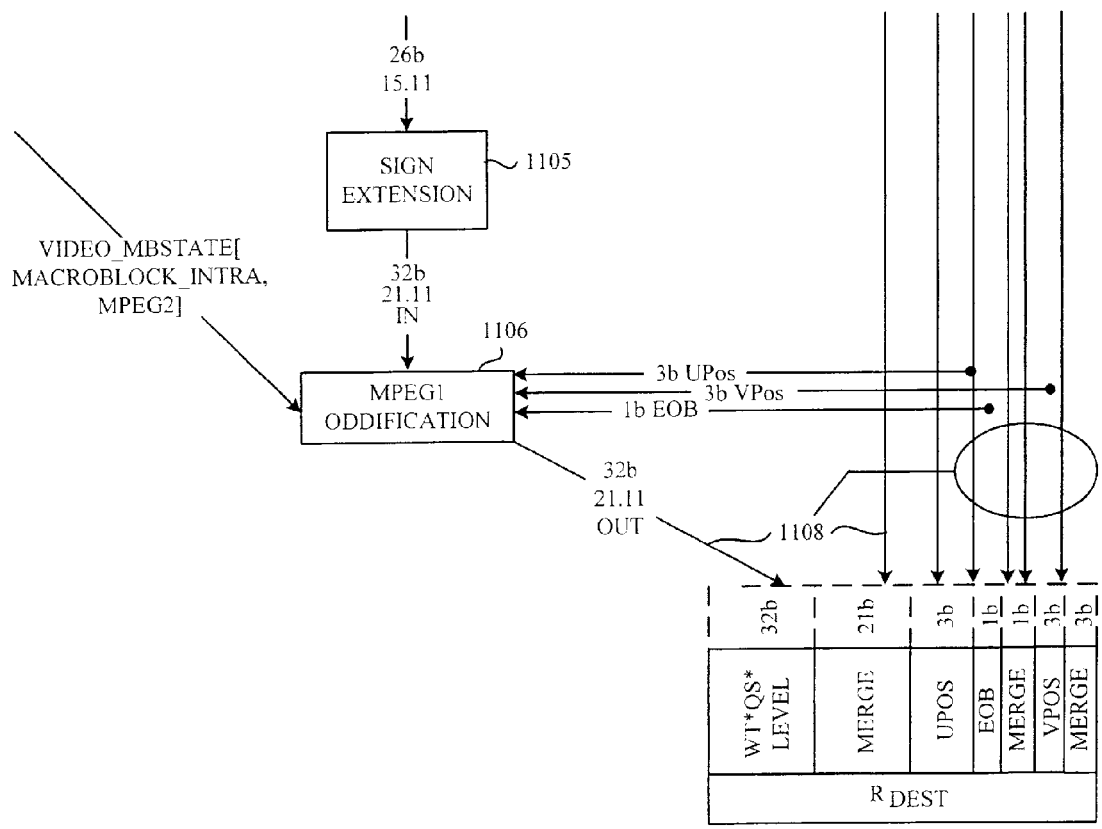

Referring to FIG. 3, call 306 (i.e., instruction VIDIQMO) is then executed. A flow diagram 1100 for instruction VIDIQMO is depicted in FIG. 11A. FIG. 11B schematically depicts the operation of instruction VIDIQMO. Table 9 depicts the encoding of instruction VIDIQMO.

TABLE 9

| 31...26 | 25...24 | 23...18 | 17...12 | 11...6 | 5...0 |
|---|---|---|---|---|---|
| 101000 | 11 | Dest | Src1 | 001100 | Src2 |

Bits [31:26, 25:24, and 11:6] specify the instruction VIDIQMO. Fields "Dest", "Src1", and "Src2" each specify one of 64 general purpose registers used in the instruction for result destination and source operands.

In step 1101, the dequantizing value, "Wt*QS", and the coefficient, "Level", are multiplied to yield a 32-bit value result ("result").

In step 1102, if the product (i.e., the value of variable "result") is negative, the 6 least significant bits are set to zero (step 1103) and the result is incremented by $2^{-11}$ (step 1104).

In this embodiment, round circuit 454 (FIG. 4H) implements the steps of 1102 and 1103 using hardwired logic.

In step 1105, a sign extension is performed to convert the 26-bit result to a 32-bit value ("In"). Steps 1102-1105 implement MPEG standard rounding.

Step 1106 determines if oddification is to be applied to "In". If (1) MPEG-1 type encoding has been employed; (2) the 8×8 block coordinates of a coefficient are not (0,0) or (7,7); and (3) the block is not part of an intra-picture, then an MPEG-1 oddification techniques will be applied to "In". In this embodiment, for coordinates (7, 7), a further inquiry is whether a non-zero coefficient is present. If there is a non-zero coefficient at (7, 7) and an end of block signal is not associated with the coordinate, then oddification is to be performed on the coefficient at coordinates (7, 7). Values of variables used to decide whether to perform oddification include "UPos", "VPos", "eob" from the general purpose register specified in field "Src1", variables "macroblock_intra" and "mpeg2" from special purpose register "Video_MBstate". Variables "macroblock_intra" and "Video_MBstate" represent whether the current block is part of an I-picture, and whether MPEG-2 format encoding has been applied, respectively.

In step 1107, oddification is performed. A discussion of MPEG-1 oddification techniques is provided in Mitchell, J., Pennebaker, W., Fogg, C., and LeGall, D., *MPEG Video Compression Standard*, Chapman and Hall, New York, N.Y. (1996). First, if "In" is positive and the least significant bit of "In" is zero, then "In" is decremented by $2^{-11}$. Next, if "In" is negative and the least significant bit of "In" is zero, then "In" is incremented by $2^{-11}$.

In this embodiment, oddification circuit 460 (FIG. 4H) performs the operations of steps 1106 to 1107.

In step 1108, "In" is stored as "Wt*QS*Level" in the general purpose register specified by the "Dest" of the VIDIQMO instruction.

As shown in FIG. 5, instruction VIDIQMO makes available "eob" for use by instructions JUV and VIDIQSC and variable "Wt*QS*Level" (shown as "mo") for use by instruction VIDIQSC.

Instruction VIDIQSC

Figure 12A:
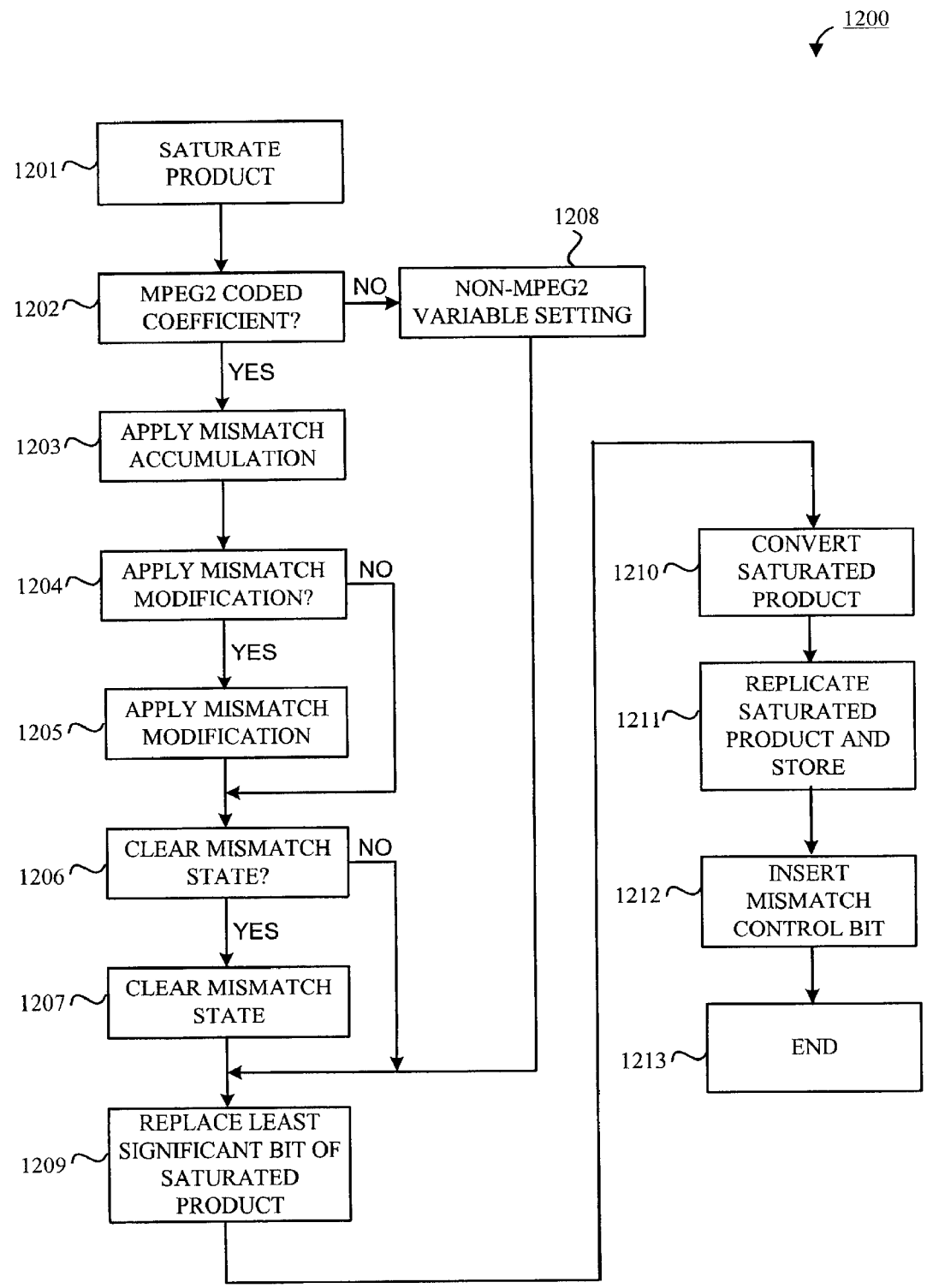
FIG. 12A depicts a flow diagram 1200 of instruction VIDIQSC (call 307) in accordance with an embodiment of the present invention.
Figures 1, 12B:
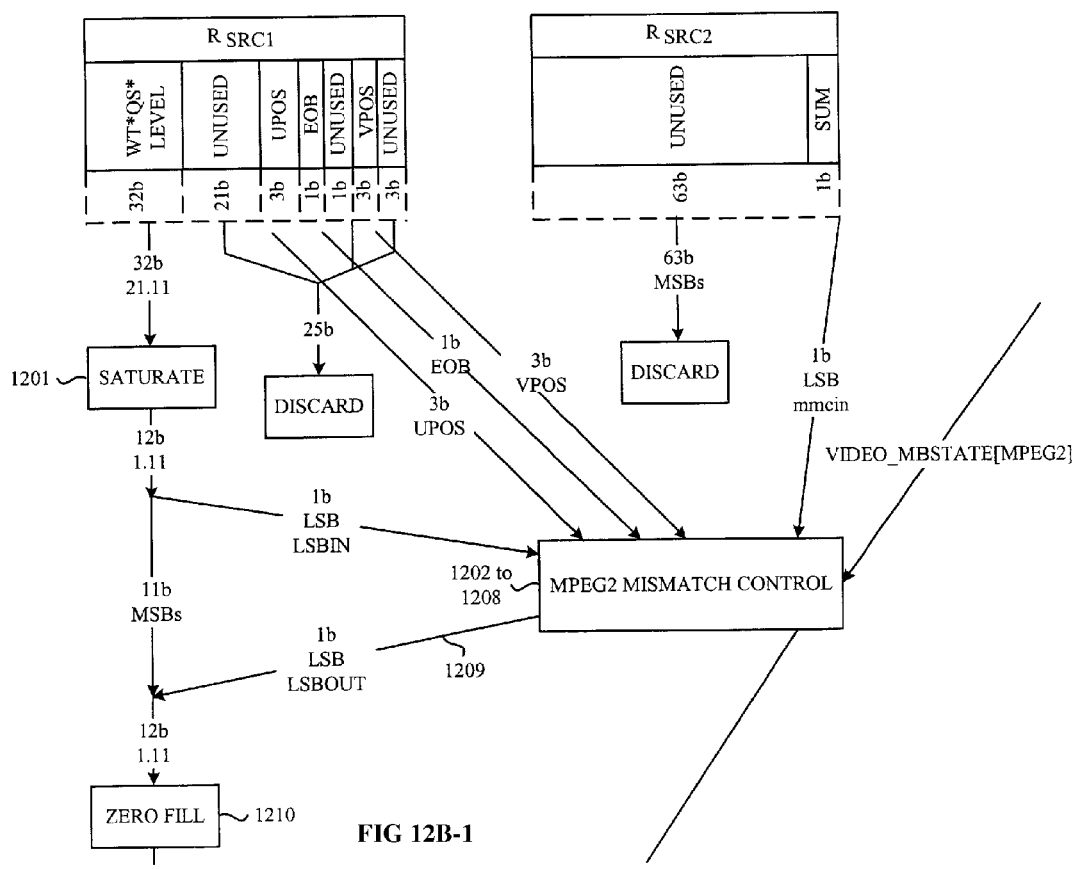
FIG. 12B schematically depicts the operation of instruction VIDIQSC in accordance with an embodiment of the present invention.
Figures 2, 12B:
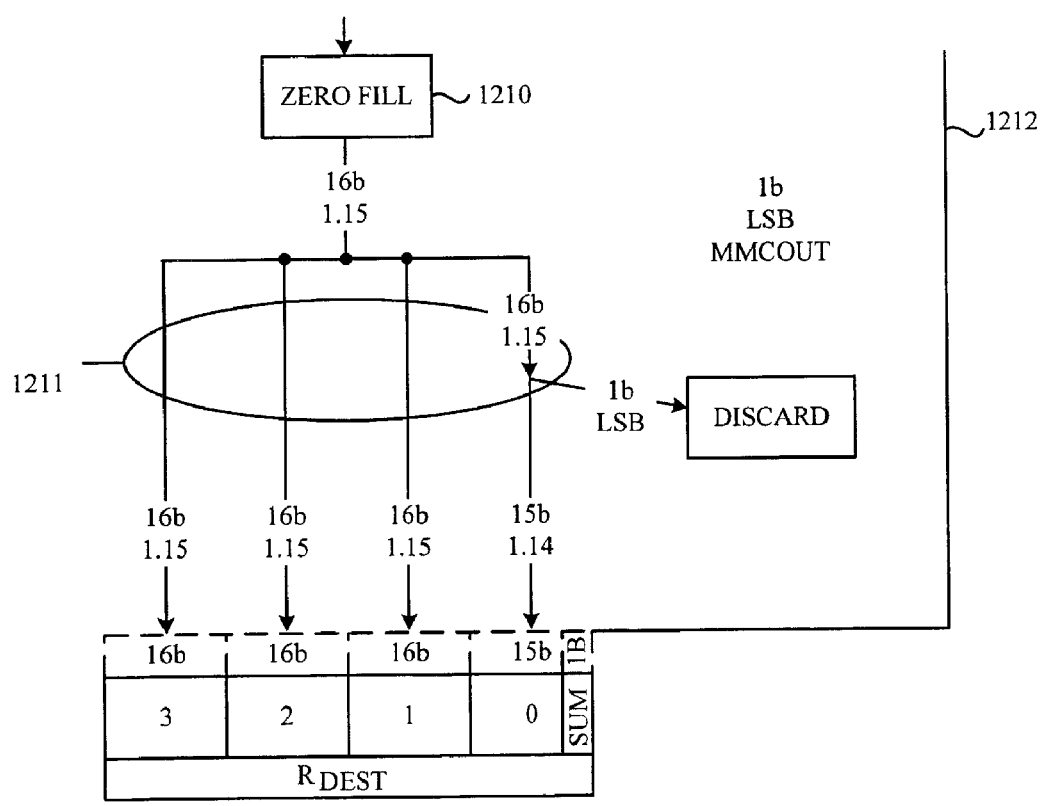

Referring to FIG. 3, call to instruction VIDIQSC (i.e., call 307) is performed. A flow diagram 1200 of instruction VIDIQSC is provided in FIG. 12A. FIG. 12B schematically depicts the operation of instruction VIDIQSC. In this embodiment, the execution of instruction VIDIQSC is performed using a hardwired logic implementation, depicted schematically as VIDIQSC circuit 464 of FIG. 4H.

Table 10 depicts the encoding of instruction VIDIQSC.

TABLE 10

| 31...26 | 25...24 | 23...18 | 17...12 | 11...6 | 5...0 |
|---------|---------|---------|---------|--------|-------|
| 101000  | 11      | Dest    | Src1    | 001101 | Src2  |

Bits [31:26, 25:24, and 11:6] specify instruction VIDIQSC. The fields "Dest", "Src1", and "Src2" specify respectively general purpose registers used in the instruction.

In step 1201, variable "Wt*QS*Level" is saturated in accordance with MPEG standard.

In step 1202, if the dequantized product is encoded using MPEG-2, i.e., variable "mpeg2" is 1, then a mismatch control or accumulation procedure may be applied. Mismatch accumulation (1203) is performed by an exclusive-OR of the least-significant bits of successive "Wt*QS*level", and the values of variables "lsbIn" and "mmcIn". The result is assigned as a value to variable "mmcOut". This procedure is a shortcut to determining if the sum of all "Wt*QS*level" is odd or even. The variable "lsbIn" is then copied into variable "lsbOut".

Step 1204 determines whether to apply a mismatch modification. If ("UPos", "VPos") is (7,7) then a mismatch modification is applied in step 1205. In step 1205, mismatch modification is performed by toggling the least significant bit of saturated "Wt*QS*level", which is the value of variable "mmcIn", even if the coefficient at (7, 7) is zero. The value of variable "lsbOut" stores the toggled value of variable "mmcIn".

Step 1206 determines whether to clear the mismatch state. If variable "eob" indicates an end-of-block associated with the coefficient at coordinates (7, 7), then accumulated mismatch control variable "mmcOut" is set to zero in step 1207. In step 1208, if the current video data is not encoded under the MPEG-2 standard, then the value of variable "lsbOut" is set to the value of variable "lsbIn" and the value of accumulated mismatch control variable "mmcOut" is set to zero.

In step 1209 the value of variable "lsbIn" is stored as the value of variable "lsbOut", replacing the least significant bit of the saturated value of variable "Wt*QS*Level".

In step 1210, the "Wt*QS*Level" value is extended from 12 bits to 16 bits by inserting zeroes. In step 1211, the 16-bit "Wt*QS*Level" is replicated four times and stored in the general purpose register specified by the field "best" of the VIDIQSC instruction. For the least significant 16 bits in that general purpose register, in step 1212, the least significant bit is replaced with the value of variable "mmcOut".

As shown in FIG. 5, the contents of field "Dest", including variable "mmcOut" are available to subsequent executions of instruction VIDIQSC. The four copies of "Wt*QS*Level" (shown as "sc") are available for use in instruction VIDIDCT.

Instruction VIDIDCT

Figure 13A:
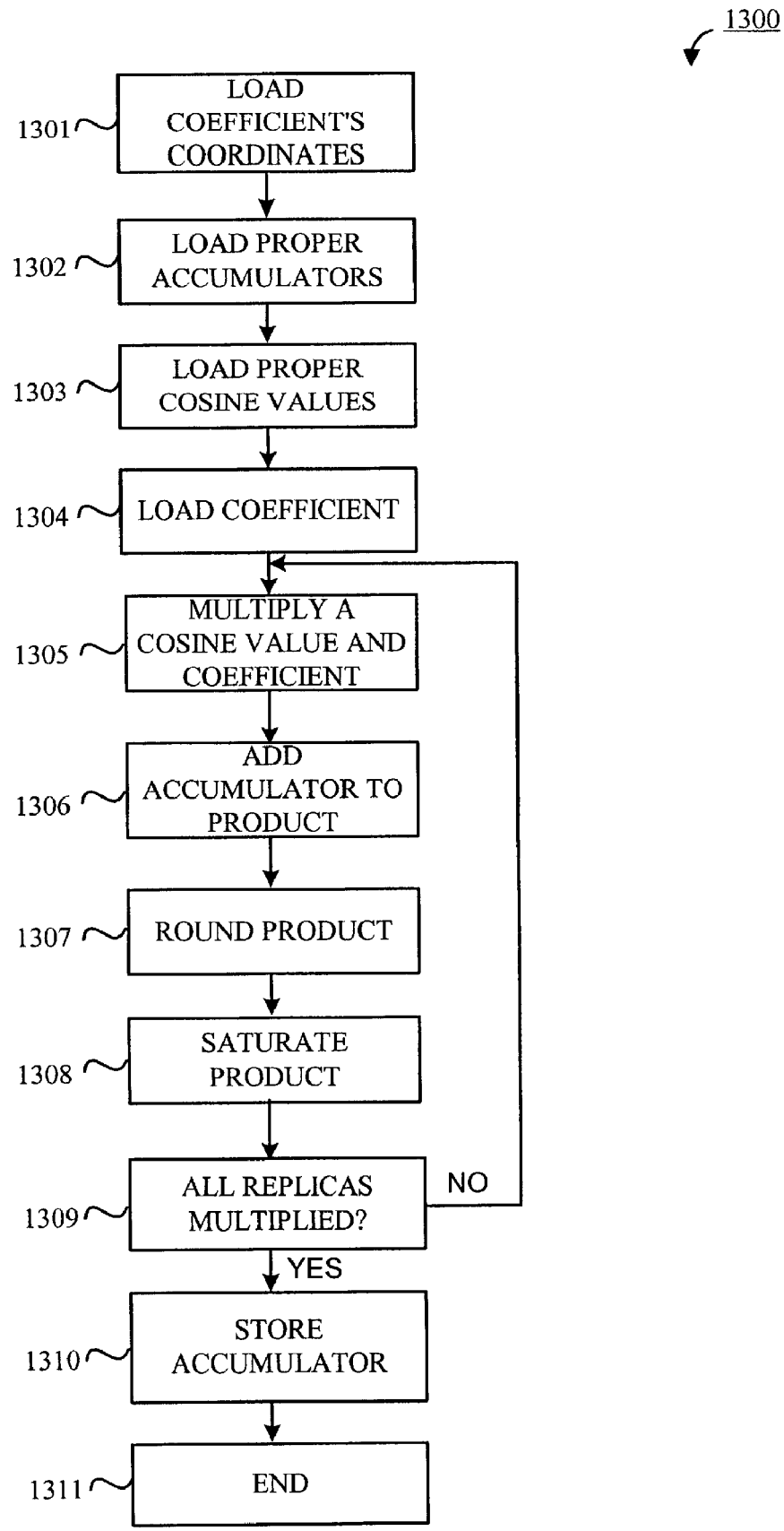
FIG. 13A depicts a flow diagram 1300 of instruction VIDIDCT (call 308) in accordance with an embodiment of the present invention.
Figures 1, 13B:
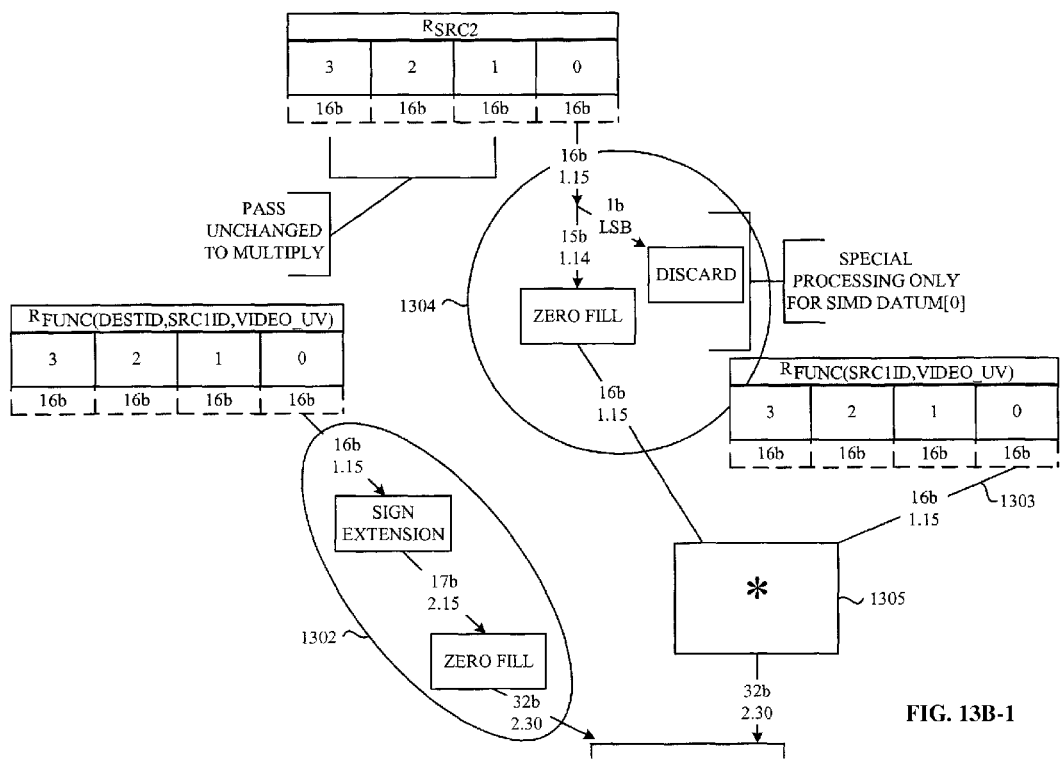
FIG. 13B schematically depicts the operation of instruction VIDIDCT in accordance with an embodiment of the present invention.
Figures 2, 13B:
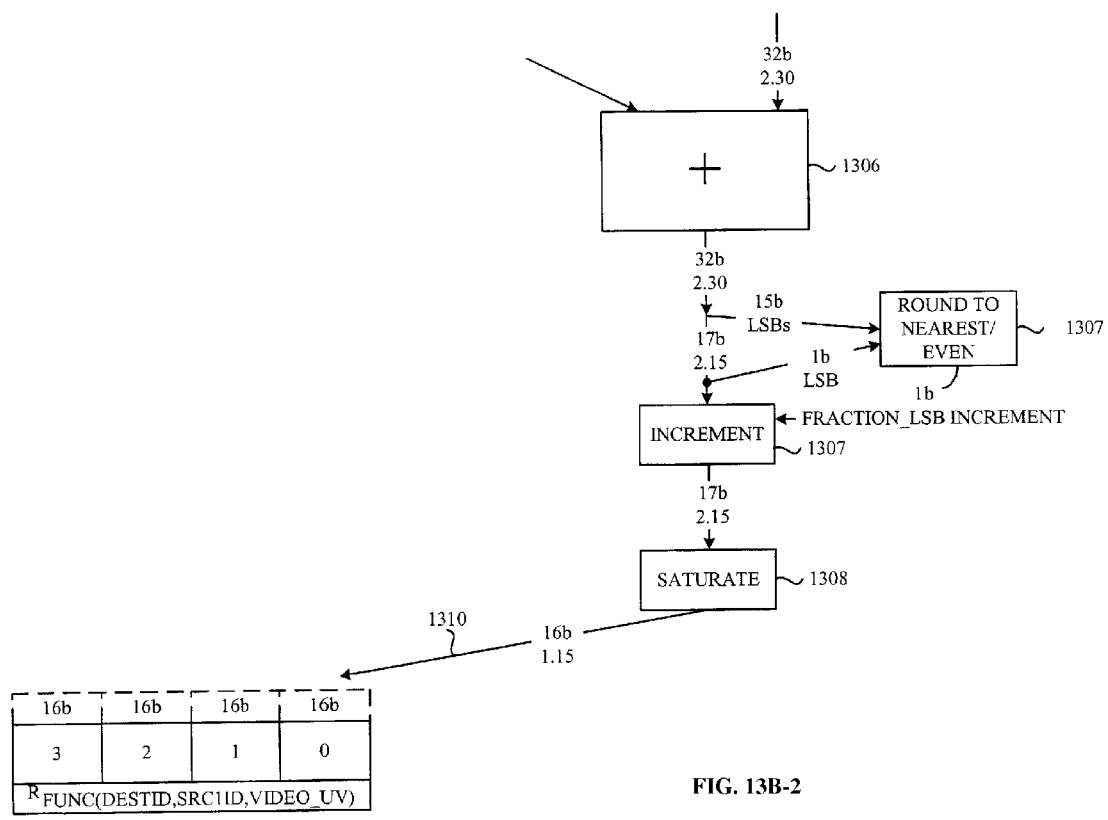

Referring to FIG. 3, instruction VIDIDCT (i.e., call 308) is executed to perform a horizontal inverse discrete cosine transform for an 8×8 block (instruction PBFY completes the horizontal inverse discrete cosine for all coefficients in a block). A flow diagram 1300 of instruction VIDIDCT (call 308) is depicted in FIG. 13A. FIG. 13B schematically depicts the operation of instruction VIDIDCT. Pseudocode for instruction VIDIDCT is provided in Appendix E.

Table 12 depicts the encoding of instruction VIDIDCT.

TABLE 12

| 31...26 | 25...24 | 23...22 | 21...18 | 17...15 | 14...12 | 11...6 | 5...0 |
|---------|---------|---------|---------|---------|---------|--------|-------|
| 101000  | 11      | DestID  | 0000    | Src1ID2 | UVReg   | 001110 | Src2  |

Bits [31:26, 25:24, and 11:6] specify instruction VIDIDCT. Fields "DestID" and "Src1ID2" specify base general purpose register addresses. Field "UVReg" identifies a byte in a special purpose register Video_UV. Field "Src2" specifies a general purpose register used in the instruction.

In step 1301, the values of variables "u" and "v", which represent respectively the coordinates of a coefficient in an 8×8 block are extracted from special purpose register "Video W", based on "VideoID", the byte position of the coefficient's information.

In step 1302, an appropriate accumulator, represented by variable "r", is chosen. There are 16 accumulators, numbered 0 to 15. An accumulator is allocated for each "u" or "v" coordinate in a block. Consistent with the MPEG standard, in a horizontal IDCT, a single coefficient is effectively multiplied by a row of 8 cosine values. Each product is then added or accumulated in each of the coordinates along a row. Hence for each row, eight cosine products are accumulated for each coordinate. An analogous procedure accumulates eight cosine products for each coordinate along a column in a vertical IDCT.

Table 13 indicates the accumulator number used for each coordinate in a block. The accumulator number corresponds to the concatenation of $u_0$ with $v_{2...0}$.

TABLE 13

| 0 | 8 | 0 | 8 | 0 | 8 | 0 | 8 |
|---|---|---|---|---|---|---|---|
| 1 | 9 | 1 | 9 | 1 | 9 | 1 | 9 |
| 2 | 10 | 2 | 10 | 2 | 10 | 2 | 10 |
| 3 | 11 | 3 | 11 | 3 | 11 | 3 | 11 |
| 4 | 12 | 4 | 12 | 4 | 12 | 4 | 12 |
| 5 | 13 | 5 | 13 | 5 | 13 | 5 | 13 |
| 6 | 14 | 6 | 14 | 6 | 14 | 6 | 14 |
| 7 | 15 | 7 | 15 | 7 | 15 | 7 | 15 |

Note that consecutive coefficients across a row are not assigned to the same accumulator. In this embodiment, each accumulator stores four 16-bit values. The relevance of this feature will be discussed below.

General purpose registers are used as accumulators. The value of variable "DestID" specifies a base address of a group of general purpose registers. Table 14 depicts the general purpose register group corresponding to each DestID value.

TABLE 14

| DestID | General purpose register Base Address |
|---|---|
| 0 | R0 |
| 1 | R16 |
| 2 | R32 |
| 3 | R48 |

The appropriate accumulator, specified by the value of variable "r", is chosen by the concatenation of $u_0$ with $v_{2...0}$ with the base address of the general purpose register specified by field "DestID".

In step 1303, four cosine values are chosen. The value of variable "s" includes 4 cosine values. The value of variable "Src1ID2", encoded in the instruction, also represents a base address for a group of general purpose registers. Table 15 depicts the relationship between Scr1ID2 and the group of general purpose registers.

TABLE 15

| Src1ID2 | general purpose register base |
|---|---|
| 0 | R0 |
| 1 | R8 |
| 2 | R16 |
| 3 | R24 |
| 4 | R32 |
| 5 | R40 |
| 6 | R48 |
| 7 | R56 |

The value of variable $u_{2...0}$ is concatenated with the bit pattern in field "Src1ID2" to provide the general purpose register number. The general purpose register corresponding to the general purpose register number thus obtained stores the four cosine values (i.e., value of variable "s").

Table 16 depicts an example of 8 rows of 4 cosine values specified in the MPEG standards to be used in the IDCT. The table 16 is merely illustrative and is not a precise representation of the values. See the MPEG standards for the desired precision of the cosine values. Variable $u_{2...0}$ discussed earlier specifies which row of four cosine values to use.

TABLE 16

| row | | | | |
|---|---|---|---|---|
| 0 | 0.354 | 0.354 | 0.354 | 0.354 |
| 1 | 0.490 | 0.416 | 0.278 | 0.098 |
| 2 | 0.462 | 0.191 | -0.191 | -0.462 |
| 3 | 0.416 | -0.098 | -0.490 | -0.278 |
| 4 | 0.354 | -0.354 | -0.354 | 0.354 |
| 5 | 0.278 | -0.490 | 0.098 | 0.416 |
| 6 | 0.191 | -0.462 | 0.462 | -0.191 |
| 7 | 0.098 | -0.278 | 0.416 | -0.490 |

The full cosine IDCT matrix is 8 by 8. However, because of the symmetry of the full matrix, only a half of the matrix needs to be stored and used. For rows 0, 2, 4, and 6, values in columns 4 . . . 7 of the cosine matrix (not depicted) are the same as in columns 3 . . . 0. For rows 1, 3, 5, and 7, values in columns 4 . . . 7 of the cosine matrix (not depicted) are negative the values in columns 3 . . . 0.

In step 1304, four copies of a coefficient, denoted as variable "t" in the pseudo code, are loaded from the general purpose register labeled "Src2". Using AND circuit 459 of FIG. 4H, the least significant bit of the copy of the least significant bits is set to zero. In this embodiment, the least significant bit is discarded here because it is used to record the MPEG-2 mismatch control state and thus should not be subject to an horizontal IDCT.

In step 1305, bits i to 15+i of coefficient ("$t_{15+i...i}$") are multiplied to a corresponding cosine value (i.e., the value of variable "$s_{15+i...i}$"). The product is assigned to as the value of 32-bit variable "p".

In step 1306, the variables "r" and "p" are added and stored in register "n". A suitable process of step 1306 follows. The 32-bit variable "p" is added to a 32-bit value of variable "n", which is stored in the accumulator specified by the value of variable "$r_{15+i...i}$". The value of variable "r" is expanded into a 32-bit value by placing the most significant bit of "$t_{15+i...i}$" into bit position 31 and by filling the 15 least significant bits with zeros. The 16-bit value of variable "r" is placed in bits 30 to 15. The 32-bit product "p" is then added to the 32-bit expanded value of variable "r".

In step 1307, function Round rounds 32-bit accumulator variable "n" to the nearest integer. In this embodiment, the least-significant bits of variable "n" represent a fraction. The range of values of variable "n" ranges from −1 to just under +1. The rounded value is assigned to variable "o".

In step 1308, function SaturateSS converts the value of variable "o". For values between −2 to just under −1, the value of variable "o" is assigned −1. Similarly, for a value from +1 to +2, the value of variable "o" is assigned +1. Essentially, saturation occurs when a 16-bit value has overflowed to 17-bit value. The result of function SaturateSS is stored in 16 bits of variable "$result_{15+i...i}$".

Steps 1305-1308 are repeated three more times, assigning the iteration index "i" the values 16, 32, and 48, respectively. The i values select the 16-bit quantities at bits 16-31, bits 32-47, and bits 48-63, respectively from each of values of variables "s" (i.e., the cosine matrix), and the coefficients in variable "t". In this embodiment, four iterations of steps 1305 to 1308 are performed in parallel.

In step 1310, the 64-bit accumulator variable "$r_{63...0}$" is stored back into the same general purpose register from which it was loaded. Accumulator variable "$r_{63\ldots0}$" includes variable "$result_{15+i\ldots i}$" for i=0, 16, 32, and 48.

Instruction JUV

Referring to FIG. 3, instruction JUV (call 309) is executed next. Table 17 depicts the encoding of instruction JUV.

TABLE 17

| 31...26 | 25...24 | 23 | 22...20 | 19...0 |
|---------|---------|----|---------|--------|
| 011010  | 11      | 0  | UVReg   | Disp   |

Figure 14:
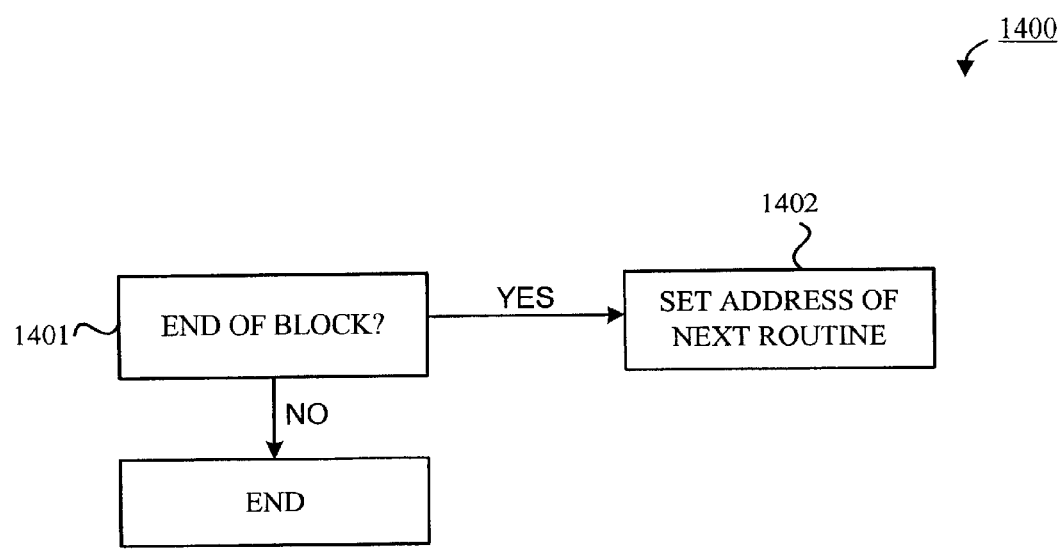
FIG. 14 depicts a flow diagram 1400 of instruction JUV (call 309) in accordance with an embodiment of the present invention.

Bits [31:26, 25:24, and 23] specify instruction JUV. The value of variable "Disp" represents a displacement, i.e., the number of 32-bit words, between the instruction sequentially following the JUV instruction, and a next instruction. FIG. 14 depicts a flow diagram 1400 of instruction JUV (call 309). In step 1401, a bit in the special purpose register Video_UV is examined to determine whether there is an end-of-block signal associated with a coefficient. If an end-of-block code is not detected, JUV ends. Execution continues at the instruction sequentially following instruction JUV.

If an end-of-block code is detected, then in step 1402, a displacement, provided as the value of variable "target_displ", is added to the value of variable "ip_seq", which represents the address of the next instruction.

Instruction PBFY

Figure 15:
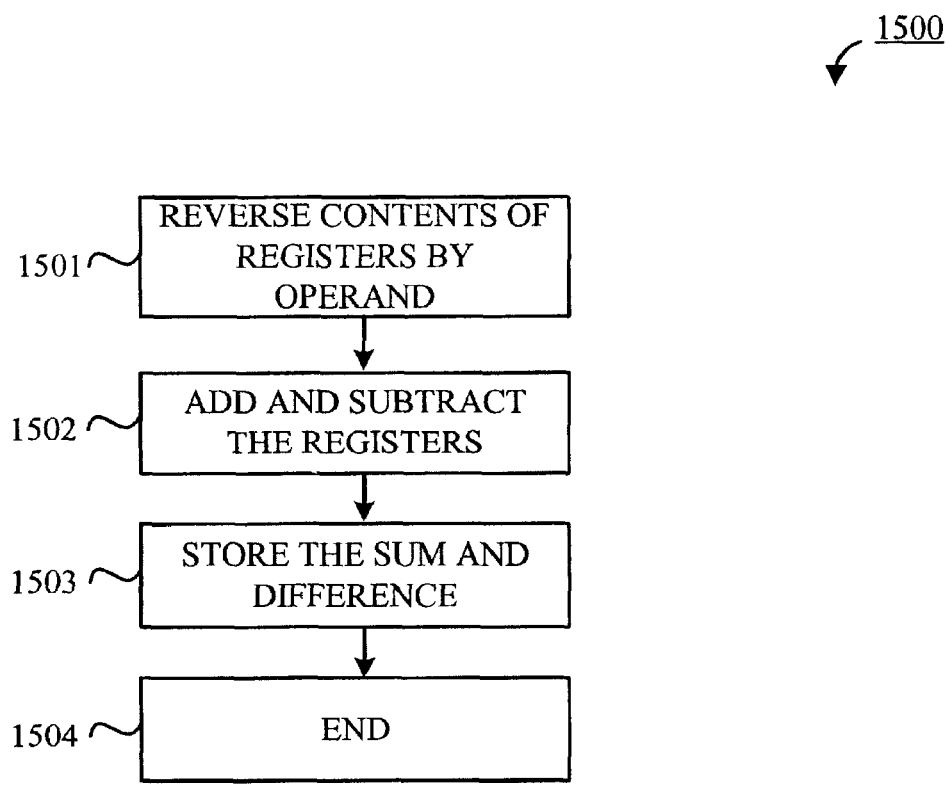
FIG. 15 depicts a flow diagram 1500 of instruction PBFY in accordance with an embodiment of the present invention.

Instruction PBFY is executed after all instructions VIDUV, VIDMUX, VIDIQMO, VIDIQSC, and VIDIDCT are applied to all coefficients of a full block. Instruction PBFY causes the horizontal IDCT of a coefficient described with respect to FIG. 13A to be applied across an 8 coordinate row of a block. FIG. 15 depicts an operation 1500 of instruction PBFY.

Table 18 depicts the encoding of instruction PBFY.

TABLE 18

| 31...27 | 26 | 25...24 | 23...18 | 17...12 | 11...6 | 5...0 |
|---------|----|---------|---------|---------|--------|-------|
| 01100   | 1  | Msize   | Dest    | Src1    | 010110 | Src2  |

Bits 31 . . . 27, 26, and 11 . . . 6 indicate the instruction is PBFY. "Msize" is the size of operand variables.

"Dust", "Src1", and "Src2" are general purpose register identifiers used in the instruction.

Under the MPEG standard for horizontal IDCT each coordinate in a row receives a contribution from the cosine products of all coordinates in its row. In the instruction VIDIDCT, only a contribution of cosine products from alternating coordinates was made. As depicted in Table 13, horizontal IDCT of consecutive coefficients across a row are stored in staggered accumulators. For example, in the top row, row 0, accumulator 0 stores accumulations for positions (0, 0), (0, 2), (0, 4), and (0, 6) while accumulator 8 stores accumulations for positions (0, 1), (0, 3), (0, 5), and (0, 7). In instruction PBFY, contributions from (0, 5) and (0, 7) are made to respective positions (0, 0), (0, 2) and contributions from (0, 1) and (0, 3) are made to respective positions (0, 4) and (0, 6). Contributions in PBFY are analogous to interlocking teeth where positions (x,7) to (x,4) are folded into respective positions (x,0) to (x,3). For rows 0, 2, 4, and 6 contributions from (x, 7) to (x, 4) are additive. However, for odd rows numbered 1, 3, 5, and 7, negative contributions are made from (x, 7) to (x, 4). This is scheme is due to the symmetries of the cosine matrix discussed above. For even rows, columns 0-3 of the cosine matrix are the same as columns 7-4 respectively. For odd rows, columns 0-3 of the cosine matrix are the negative of columns 7-4 respectively.

As stated earlier, instruction VIDIDCT does not perform a full horizontal inverse discrete cosine transform on a coefficient. Following decoding of all variable length codes in a single block, instruction PBFY is executed to complete a horizontal inverse discrete cosine transform on the coefficients of a block.

In step 1501, by directive "switch(msize)", the contents of registers "Src1" and "Src2" are reversed by operand. Registers Src1 and Src2 include respective alternating accumulators used in a row. For example for row 0, the top row, Src1 would include accumulator 0 and Src2 would include accumulator 8. Where the operand size is 16 bits, the most significant operand, i.e., in bits 63 . . . 48, switches place with the least significant operand, in bits 15 . . . 0. Variable "Maize" specifies whether an operand is 8, 16, or 32 bits. The process continues until the order of operands is reversed.

In step 1502, each operand of registers "Src1" and "Src2" are added and subtracted in parallel. Variable "sum" represents the sum of the contents of registers "Src1" and "Src2". Variable "diff" represents the contents of register "Src1" minus the contents of register "Src2". Overflow values of "sum" or "diff" are saturated. Table 11, discussed above, depicts saturation formats.

In step 1503, variables "sum" and "diff" are stored in respective general purpose registers "Dest" and "Dest+1". The contents of the registers are made available for a subsequent vertical IDCT.

To complete variable length decode of a block, following the instruction PBFY, a conventional vertical IDCT is performed. A block is thereby converted to the time domain. In this embodiment, an exemplary vertical IDCT uses a process available from IBM entitled AAN Algorithm.

This embodiment of the present invention provides a system of flexibly mapping groups of 64 general purpose registers to various uses by the different instructions.

Example of Interleaved Operation

Table 19 illustrates, for a single clock cycle having sequential stages C, D, R, A, M, E, and W, a relationship between sequential stages C, D, R, A, M, E, and W, and operative components of first ALU 410.1, second ALU 410.2, and third ALU 410.3.

TABLE 19

| Stage | operative components of first ALU 410.1 | operative components of second ALU 410.2 | operative components of third ALU 410.3 |
|-------|------------------------------------------|-------------------------------------------|------------------------------------------|
| C     |                                          |                                           |                                          |
| D     |                                          |                                           |                                          |
| R     |                                          |                                           |                                          |
| A     | 411, 414, 412, 416                       |                                           | 450, 459                                 |
| M     |                                          | 431, 436                                  | 450, 454,                                |
| E     |                                          | 436, 443, 440, 439                        | 452, 454, 460, 464                       |
| W     |                                          |                                           |                                          |

Appendix H illustrates an example operation of multiple instructions during stages of multiple clock cycles. See Appendix I for the sequential order of the instructions of Appendix H. For example in cycle 1627, in stage R, first ALU 410.1 begins executing instruction LDBITSR. Instruction LDBITSR is not completed until cycle 1632. However, in cycle 1628, stage R, the second ALU 410.2 begins executing instruction VIDRSVLD with an operand as one of the variable length codes loaded by instruction LDBITSR. Instruction VIDRSVLD is not completed until cycle 1633. In cycle 1630, stage R, second ALU 410.2 begins executing instruction VIDUV. Instruction VIDUV is not completed until cycle 1634. In cycle 1636, stage R, the first ALU 410.1 begins executing instruction VIDMUX. Instruction VIDMUX is not completed until cycle 1641. In cycle 1639, stage R, the third ALU 410.3 begins executing instruction VIDIQMO. Instruction VIDIQMO is not completed until cycle 1643. In cycle 1642, stage R, the third ALU 410.3 begins executing instruction VIDIQSC. Instruction VIDIQSC is not completed until cycle 1646. In cycle 1644, stage R, the third ALU 410.3 begins executing instruction VIDIDCT. Instruction VIDIDCT is not completed until cycle 1648 (not depicted). Thus instructions that operate on a single coefficient begin prior to completing instructions begun prior. Note that in Appendix H, "r" represents a number of a general purpose register and "0.2" following an instruction represents that an instruction is operating for a second coefficient.

As shown in Appendix H, simultaneously with decoding of the second coefficient, at least a first, fifth, sixth, and seventh coefficient are at some stage of decoding.

In practice, the user can specify an order of instructions which maximizes the speed of variable length code decoding.

In the example of Appendices H and I, at most 8 coefficients can be decoded at any time (8 corresponding to the number of registers in VIDEO_UV Register). Of course, if both the size of VIDEO_UV Register and the number of general purpose registers are increased, the number of coefficients decoded at any time increases.

Modifications

The above-described embodiments of the present invention are illustrative and not limiting. It will thus be obvious to those skilled in the art that various changes and modifications may be made without departing from this invention in its broader aspects. For example, the instruction set architecture could be MIPS or RISC based. The embodiments of the present invention could apply, e.g., to MPEG-4, JPEG, and H.261 type codes. Therefore, the appended claims encompass all such changes and modifications as fall within the true spirit and scope of this invention.

What is claimed is:

1. An apparatus comprising:
   at least one general purpose register;
   at least one special purpose register; and
   an execution unit that is operative to execute at least two instructions in parallel to decode variable length codes, wherein each of the instructions share use of the at least one general purpose register and the at least one special purpose register.

2. The apparatus of claim 1 wherein the execution unit comprises a plurality of functional units and wherein at least one of the functional units comprises:
   a zero fill circuit that is operative to load a level value associated with a bit stream comprising the variable length code from the at least one general purpose register;
   a shifter circuit that is operative to shift the level value thereby increasing a number of bits of the level value and to store the level value in the at least one general purpose register; and
   a scan table circuit that is operative to convert linear coordinates of the level value into block coordinates and to store the block coordinates into the at least one general purpose register.

3. The apparatus of claim 1 wherein the execution unit comprises a plurality of functional units and wherein at least one of the functional units comprises:
   a variable length decode circuit that is operative to receive an input bitstream comprising the variable length code from the at least one general purpose register, to generate decoded variable length code based on parameters stored in the at least one general purpose register, to provide a length of the decoded variable length code, and to store the decoded variable length code in the at least one general purpose registers;
   a shifter that is operative to shift the input bitstream based on the length; and
   an adder circuit that is operative provide a sum based on a summation of the length and a bit pointer from the at least one general purpose register, and to store the sum in the at least one general purpose register, wherein the sum specifies a beginning of an undecoded portion of the input bitstream stored in the at least general purpose register and wherein the adder circuit is operative.

4. The apparatus of claim 1 wherein the execution unit comprises a plurality of functional units and wherein at least one of the functional units comprises:
   a multiplier circuit that is operative to multiply a cosine value with a dequantized value to generate a product and to store the cosine value and the dequantized value in the at least one general purpose register; and
   an adder circuit that is operative to load an accumulator register of the at least one general purpose register, to add contents of the accumulator register to the product to generate a sum, and to store the sum into at least one of the general purpose registers.

5. The apparatus of claim 1 wherein the execution unit comprises a plurality of functional units and wherein at least one of the functional units comprises:
   a first accumulator that is operative to store a first value;
   a second accumulator that is operative to store a second value; and
   an arithmetic circuit that is operative to simultaneously add and subtract the first value and the second value to generate a respective sum and difference and to store at least one of the sum and difference in the at least one general purpose register.

6. The apparatus of claim 1 wherein the variable length codes comprises MPEG information.

7. The apparatus of claim 1, wherein the apparatus comprises a television.

8. The apparatus of claim 1, wherein the apparatus comprises a MPEG decoder.

9. The apparatus of claim 1, wherein the apparatus comprises a DVD player.

10. The apparatus of claim 1, wherein the apparatus comprises a digital video player.

11. An apparatus comprising:
    a processor operative to execute executable instructions that when executed by the processor cause the processor to:
    store variable length code information among a plurality of general purpose registers;
    generate decoded variable length code information by decoding the at least one variable length code; and
    store the decoded variable length code information among the plurality of general purpose registers.

12. The apparatus of claim 11 wherein the locations of the general purpose registers in memory are dynamically allocated during run-time.

13. The apparatus of claim 11 wherein the variable length code information comprises MPEG information.

14. The apparatus of claim 11, wherein the apparatus comprises a television.

15. The apparatus of claim 11, wherein the apparatus comprises an MPEG decoder.

16. The apparatus of claim 11, wherein the apparatus comprises a DVD player.

17. The apparatus of claim 11, wherein the apparatus comprises a digital video player.

* * * * *